United States Patent
Shirzadi

(10) Patent No.: US 9,313,316 B2
(45) Date of Patent: Apr. 12, 2016

(54) DEVICE AND METHOD FOR FILTERING MESSAGES

(71) Applicant: BLACKBERRY LIMITED, Waterloo (CA)

(72) Inventor: Farhoud Shirzadi, Kitchener, CA (US)

(73) Assignee: BLACKBERRY LIMITED, Waterloo, Ontario (CA)

( * ) Notice: Subject to any disclaimer, the term of this patent is extended or adjusted under 35 U.S.C. 154(b) by 201 days.

(21) Appl. No.: 13/943,847

(22) Filed: Jul. 17, 2013

(65) Prior Publication Data

US 2015/0026590 A1    Jan. 22, 2015

(51) Int. Cl.
| | |
|---|---|
| *G06F 3/00* | (2006.01) |
| *H04M 1/725* | (2006.01) |
| *G06F 3/01* | (2006.01) |
| *G06F 1/16* | (2006.01) |
| *G06F 3/0482* | (2013.01) |
| *G06Q 10/10* | (2012.01) |
| *G06F 3/0488* | (2013.01) |

(52) U.S. Cl.
CPC ......... *H04M 1/72547* (2013.01); *G06F 1/1626* (2013.01); *G06F 3/017* (2013.01); *G06F 3/0482* (2013.01); *G06F 3/04883* (2013.01); *G06F 3/04886* (2013.01); *G06Q 10/107* (2013.01); *H04M 1/72552* (2013.01); *H04M 2250/22* (2013.01)

(58) Field of Classification Search
CPC .. H04M 1/72547; G06Q 10/101; G06F 3/048
USPC ........................................................ 715/751
See application file for complete search history.

(56) References Cited

U.S. PATENT DOCUMENTS

| | | | |
|---|---|---|---|
| 8,914,752 B1 * | 12/2014 | Spiegel | 715/863 |
| 2005/0223077 A1 * | 10/2005 | Vellanki et al. | 709/207 |
| 2008/0171535 A1 * | 7/2008 | Carmody et al. | 455/412.2 |
| 2009/0083658 A1 * | 3/2009 | Ito et al. | 715/781 |
| 2009/0247112 A1 | 10/2009 | Lundy et al. | |
| 2010/0134425 A1 | 6/2010 | Storrusten | |
| 2011/0157029 A1 | 6/2011 | Tseng | |
| 2011/0231499 A1 | 9/2011 | Stovicek et al. | |
| 2011/0252369 A1 | 10/2011 | Chaudhri | |
| 2012/0290947 A1 | 11/2012 | Baggett et al. | |
| 2013/0097566 A1 * | 4/2013 | Berglund | 715/863 |

(Continued)

FOREIGN PATENT DOCUMENTS

| | | |
|---|---|---|
| EP | 2369820 A2 | 9/2011 |
| EP | 2584440 A1 | 4/2013 |

OTHER PUBLICATIONS

Extended European Search Report dated Dec. 16, 2014, issued on Corresponding European Patent Application No. 14177335.8.

(Continued)

*Primary Examiner* — Angie Badawi
(74) *Attorney, Agent, or Firm* — Perry + Currier, Inc.

(57) ABSTRACT

A device and method for filtering messages is provided. The device comprises: a processor; a memory storing messages, at least a subset of the messages designated as unread messages; and a touchscreen including a display. A sliding touch input is detected at the touchscreen, the sliding touch input including a change in direction, the sliding touch input terminating in a static touch input proximal an edge of the touchscreen. In response to detecting the static touch input, a list of the unread messages is provided at the display.

18 Claims, 13 Drawing Sheets

(56) References Cited

U.S. PATENT DOCUMENTS

| | | |
|---|---|---|
| 2013/0102281 A1 | 4/2013 | Kanda et al. |
| 2013/0145290 A1 | 6/2013 | Weber et al. |
| 2013/0145295 A1* | 6/2013 | Bocking et al. ............... 715/764 |
| 2013/0187873 A1* | 7/2013 | Jeong ............................ 345/173 |
| 2014/0165012 A1 | 6/2014 | Shen et al. |
| 2014/0267068 A1 | 9/2014 | Smith |

OTHER PUBLICATIONS

Extended European Search Report dated Dec. 16, 2014, issued on Corresponding European Patent Application No. 14177344.0.

Nguyen, Phuong H., U.S. Examiner, "Device and Method for Filtering Messages Using Sliding Touch Input", Office Action issued in U.S. Appl. No. 13/943,882, filed Jul. 17, 2013.

* cited by examiner

DEVICE AND METHOD FOR FILTERING MESSAGES

FIELD

The specification relates generally to electronic devices, and specifically to a device and method for filtering messages.

BACKGROUND

The evolution of computers is currently quite active in the electronic device environment. It is now well-known to including messaging functions in electronic devices. More recently, there has been a veritable explosion of the number and type of applications that are configured to the unique form factors and computing environments of electronic devices.

BRIEF DESCRIPTIONS OF THE DRAWINGS

For a better understanding of the various implementations described herein and to show more clearly how they may be carried into effect, reference will now be made, by way of example only, to the accompanying drawings in which.

DETAILED DESCRIPTION

Figure 1:
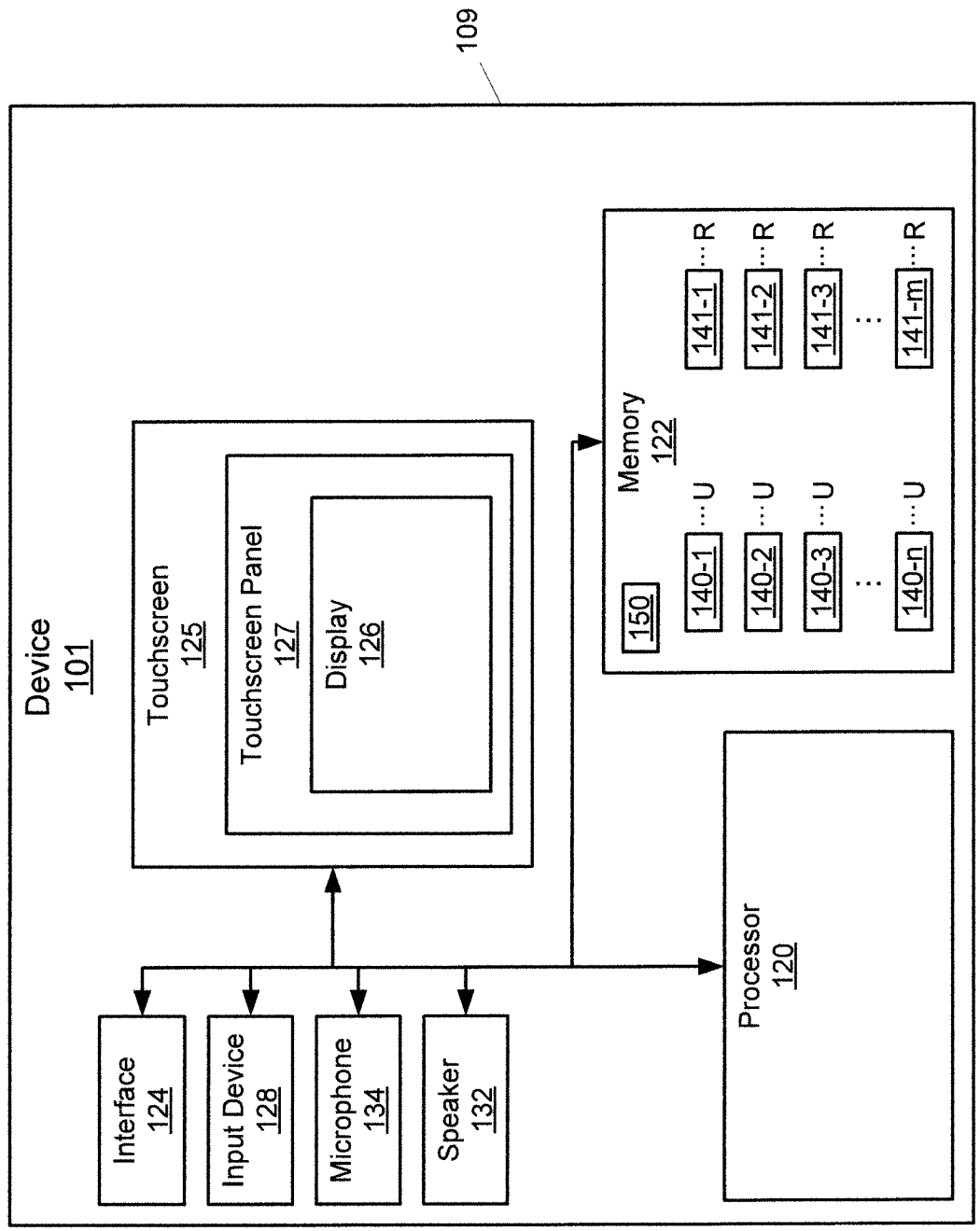
FIG. 1 depicts a schematic diagram of a device for filtering messages, according to non-limiting implementations.

In general, this disclosure is directed to a device, and in particular a mobile electronic device, with a touchscreen, that can receive and display messages, at the touchscreen. In general, mobile electronic devices represent electronic devices that are readily movable from place to place. Further such mobile electronic devices are often operated with one hand in busy environments. When such devices receive messages, it is desirable to display only unread messages; however accessing unread messages can be challenging on many devices. For example, a filter can be manually applied by adjusting a setting in a mail application using a pull down menu or the like, and/or by navigating to unread messages by actuating a series of navigation buttons. However, such operations can be finicky using one-handed operation, and are prone to errors, and/or can require two-handed operation and/or require that adjustments be made to the device that may have to be changed later so that all messages can be viewed. This specification hence describes various implementations of a device that can easily, and ergonomically, navigate to unread messages using one-handed gestures at a touchscreen.

In this specification, elements may be described as "configured to" perform one or more functions or "configured for" such functions. In general, an element that is configured to perform or configured for performing a function is enabled to perform the function, or is suitable for performing the function, or is adapted to perform the function, or is operable to perform the function, or is otherwise capable of performing the function.

In this specification, elements, such as a processor, may be described as "providing", at a display, given items, such that a display device displays a representation of those items. In general, a display and/or a display device comprises image forming apparatus and circuitry for controlling the image forming apparatus. Hence, in general, an element that "provides" an item at a display communicates with the circuitry which, in turn, controls the image forming apparatus to provide a representation of the item, for example by turning pixels of the image forming apparatus on and off, based on data and/or frame data and/or commands received at the circuitry from the element, such as a processor. Thus, when an element, such as a processor, is described as providing, at a display, a given item, a series of technical effects and/or steps occur: as such, providing a given item at a display is not to be interpreted as simply displaying information. Further, when a processor, for example, provides a given item, at a display, a physical state of a device is changed and/or modified and/or transformed.

An aspect of the specification provides a device comprising: a processor; a memory storing messages, at least a subset of the messages designated as unread messages; and a touchscreen including a display; the processor configured to: detect a sliding touch input at the touchscreen, the sliding touch input including a change in direction, the sliding touch input terminating in a static touch input proximal an edge of the touchscreen; and, in response to detecting the static touch input, provide at the display, a list of the unread messages.

The processor can be further configured to: prior to providing the list of the unread messages, provide, at the display, an initial list of the messages during the sliding touch input, the initial list of the messages including both the unread messages and the messages designated as read messages. The processor can be further configured to: provide the initial list of the messages when the change in direction is detected. A first portion of the sliding touch input can be in a first direction and a second portion of the sliding touch input can be in a second direction, and the processor can be further configured to: after the static touch input is detected, detect another sliding touch input beginning at a position of the static touch input, in an opposite direction to the second direction; and, in response, replace, at the display, the list of the unread messages with the initial list of the messages.

The processor can be further configured to, in response to detecting the static touch input, provide, at the display, a preview of a given unread message, in the list of the unread messages, when providing the list of the unread messages. The preview can include: one or more of metadata associated with the given unread message and a subject of the given unread message; and, at least a portion of a body of the unread message, wherein data provided in the list for each of other unread messages can further comprise respective metadata and a respective subject. The processor can be further configured to, in response to detecting a further sliding touch input beginning at a position of the static touch input: when the further sliding touch input is in a first direction relative to the position of the static touch input, provide, at the display, a preview of a next unread message in the list of the unread messages; and when the further sliding touch input is in a second direction opposite the first direction, provide, at the display, a preview of a previous unread message in the list of the unread messages. The processor can be further configured to, when a given change in position of the further sliding touch input occurs in a length of time greater than a threshold time period, designate a respective one of the unread messages as a read message. The processor can be further configured to, when a given change in position of the further sliding touch input occurs in a length of time greater than a threshold time period, delete a respective one of the unread messages.

The processor can be further configured to provide, at the display proximal a position of the static touch input, one or more of: a first icon indicative of at least one of that the list of the unread messages can be navigated and an area associated with the static touch input; a second icon indicative that the list of the unread messages can be navigated to preview a next unread message; and, a third icon indicative that the list of the unread messages can be navigated to preview a previous unread message.

Another aspect of the specification provides a method comprising: at device comprising: a processor; a memory storing messages, at least a subset of the messages designated as unread messages; and a touchscreen including a display, detecting a sliding touch input at the touchscreen, the sliding touch input including a change in direction, the sliding touch input terminating in a static touch input proximal an edge of the touchscreen; and, in response to detecting the static touch, input, providing, at the display, a list of the unread messages.

The method can further comprise: prior to providing the list of the unread messages, providing, at the display, an initial list of the messages during the sliding touch input, the initial list of the messages including both the unread messages and the messages designated as read messages. The method can further comprise: providing the initial list of the messages when the change in direction is detected. A first portion of the sliding touch input can be in a first direction and a second portion of the sliding touch input can be in a second direction, and the method can further comprise: after the static touch input is detected detecting another sliding touch input beginning at a position of the static touch input, in an opposite direction to the second direction; and, in response, replacing, at the display, the list of the unread messages with the initial list of the messages.

The method can further comprise, in response to detecting the static touch input, providing, at the display, a preview of a given unread message, in the list of the unread messages, when providing the list of the unread messages.

The method can further comprise, in response to detecting a further sliding touch input beginning at a position of the static touch input: when the further sliding touch input is in a first direction relative to the position of the static touch input, providing, at the display, a preview of a next unread message in the list of the unread messages; and when the further sliding touch input is in a second direction opposite the first direction, providing, at the display, a preview of a previous unread message in the list of the unread messages. The preview can include: one or more of metadata associated with the given unread message and a subject of the given unread message; and, at least a portion of a body of the unread message, wherein data provided in the list for each of other unread messages can further comprise respective metadata and a respective subject. The method can further comprise, when a given change in position of the further sliding touch input occurs in a length of time greater than a threshold time period, designating a respective one of the unread messages as a read message. The method can further comprise, when a given change in position of the further sliding touch input occurs in a length of time greater than a threshold time period, deleting a respective one of the unread messages.

The method can further comprise providing, at the display, proximal a position of the static touch input, one or more of: a first icon indicative of at least one of that the list of the unread messages can be navigated and an area associated with the static touch input; a second icon indicative that the list of the unread messages can be navigated to preview a next unread message; and, a third icon indicative that the list of the unread messages can be navigated to preview a previous unread message.

Yet a further aspect of the specification provides a computer program product comprising a computer usable medium having a computer readable program code adapted to be executed to implement a method comprising: at device comprising: a processor; a memory storing messages, at least a subset of the messages designated as unread messages; and a touchscreen including a display, detecting a sliding touch input at the touchscreen, the sliding touch input including a change in direction, the sliding touch input terminating in a static touch input proximal an edge of the touchscreen; and, in response to detecting the static touch input, providing, at the display, a list of the unread messages. The computer usable medium can comprise a non-transitory computer usable medium.

FIG. 1 depicts a schematic diagram of a mobile electronic device 101, referred to interchangeably hereafter as device 101, according to non-limiting implementations. Device 101 comprises a housing 109, a processor 120, a memory 122, a communication interface 124, a touchscreen 125 that includes a display 126 and a touchscreen panel 127, at least one optional input device 128, an optional speaker 132 and an optional microphone 134.

In particular, memory 122 stores messages 140-1, 140-2, 140-3 . . . 140-n, 141-1, 141-2, 141-3 . . . 141-m. Messages 140-1, 140-2, 140-3 . . . 140-n, 141-1, 141-2, 141-3 . . . 141-m are interchangeably referred to hereafter, collectively, as messages 140, 141 and generically as a message 140 and/or a message 141 and/or a message 140, 141. In some implementations, messages 140 can be designated as unread messages and messages 141 can be designated as read messages; in other words, at least a subset of messages 140, 141 are designated as unread messages, as described in further detail below. Hence, messages 140-1, 140-2, 140-3 . . . 140-n, are interchangeably referred to hereafter, collectively, as unread messages 140 and generically as an unread message 140; similarly, messages 141-1, 141-2, 141-3 . . . 141-m, are interchangeably referred to hereafter, collectively, as read messages 141 and generically as a read message 141.

In FIG. 1, unread messages 140 are designated as unread, at memory 122, using a "U" and read messages 141 are designated as read, at memory 122, using an "R"; however, such a convention is merely for example purposes only and any process and/or method and/or means and/or designator can be used to designate messages 140, 141 as unread or read; indeed, messages 140, 141 can be stored in a database at memory 122, and database conventions can be used to designate messages 140, 141 as unread or read. Further, while a number "n" of unread messages 140 and a number of "m" read of messages 141 are depicted in FIG. 1, any number of unread messages 140 and read messages 141 that can be stored at memory 122 is within the scope of present implementation.

Each of messages 140, 141 can include, but is not limited to, one or more of an email, a text message, a short message service (SMS) message, a multimedia message service (MMS) message, social networking message, a notification message (e.g. including, but not limited to, notifications of telephone calls, voice messages, software updates etc.) and the like.

In order to filter unread messages 140 from read messages 141, and as will be described hereafter, processor 120 is generally configured to: detect a sliding touch input at touchscreen 125, the sliding touch input including a change in direction, the sliding touch input terminating in a static touch input proximal an edge of touchscreen 125; and, in response to detecting the static touch input, provide, at display 126, a list of unread messages 140.

Device 101 can be any type of electronic device that can be used in a self-contained manner to implement messaging functions, including sending and receiving messages using the communication interface 124 and, in particular, filter messages 140, 141 so that a list of unread messages 140 is provided at display 126.

Device 101 includes, but is not limited to, any suitable combination of electronic devices, communications devices, computing devices, personal computers, laptop computers, portable electronic devices, mobile computing devices, portable computing devices, tablet computing devices, laptop computing devices, desktop phones, telephones, PDAs (personal digital assistants), cellphones, smartphones, e-readers, internet-enabled appliances and the like. Other suitable devices are within the scope of present implementations.

It should be emphasized that the structure of device 101 in FIG. 1 is purely an example, and contemplates a device that can be used for both wireless voice (e.g. telephony) and wireless data communications e.g. email, web browsing, text, and the like). However, FIG. 1 contemplates a device that can be used for any suitable specialized functions, including, but not limited, to one or more of, messaging, telephony, computing, appliance, and/or entertainment related functions.

Housing 109 can comprise any housing, casing, and the like. It is appreciated that device 101 can be portable (readily movable from place to place) and, in some implementations, device 101 can be handheld (sized and shaped to be held or carried in a human hand, and typically used while so held or carried); hence, housing 109 can be configured for a corresponding type of device 101. In general, housing 109 encloses or houses the components of device 101, such as processor 120, memory 122, communication interface 124, etc.; however some components can be visible via apertures, windows and the like in housing 109. For example, display 126 is generally visible, and touchscreen panel 127 is generally accessible for touching, for example by a finger of a user.

Touchscreen 125 comprises display 126 and touchscreen panel 127. Display 126 comprises any suitable one of or combination of CRT (cathode ray tube) and/or flat panel displays (e.g. LCD (liquid crystal display), plasma, OLED (organic light emitting diode), and the like). Touchscreen panel 127 includes but is not limited to a capacitive touchscreen panel, a resistive touchscreen panel, and the like. Touchscreen 125, and in particular touchscreen panel 127, is generally configured to receive input data, and, in particular, touch input data. Touch input data can comprise one or more of sliding touch input and static touch input. For example, sliding touch input can comprise data detected at touchscreen panel 127 that corresponds to a series of touch inputs at touchscreen panel 127 in adjacent portions of touchscreen panel 127 that represent continuous touching actuation thereof in a sliding motion; while each touch input in the sliding touch input can be discrete, depending on how often touchscreen panel is sampled by processor 120, the series of touch inputs is recognized by processor 120 as sliding touch input.

Similarly, a static touch input can comprise a series of touch inputs at touchscreen panel 127 that are all generally in a same area of touchscreen panel 127 that represent continuous touching actuation thereof without substantial movement; while each touch input in the static touch input can be discrete, depending on how often touchscreen panel 127 is sampled by processor 120, the series of touch inputs is recognized by processor 120 as a static touch input.

Processor 120 is generally configured to distinguish between a sliding touch input and a static touch input: for example, processor 120 can be configured to determine that, when a touch input is detected within a given area for a given period of time, the touch input is a static touch input, the given area and given period of time being predetermined and stored at memory 122; the given area and given period of time can be determined by one or more of experimentally, heuristically, trial and error, using user interface design software and the like.

Display 126 and touchscreen panel 127 are generally aligned such that areas of display 126, where actuatable and/or activatable and/or selectable controls and/or items are displayed, correspond to areas of touchscreen panel 127 where touch input can be received to actuate and/or activate and/or select the corresponding controls and/or items. While each of display 126 and touchscreen panel 127 can be provided separately, when integrated into device 101 as touchscreen 125, they generally work in tandem using processor 120 which controls display 126 to provide actuatable and/or activatable and/or selectable controls and/or items, and receives touch input data from touchscreen panel 127: processor 120 can determine whether an area of the touch input corresponds to the area of the display where the actuatable and/or activatable and/or selectable controls and/or items are located and control display 126, and device 101, accordingly.

Furthermore, touchscreen panel 127 can be larger than an area of display 126 so that touch input can be received at a location of touchscreen panel 127 that does not correspond to an area of display 126; for example, in these implementations, touchscreen panel 127 can extend to a bezel of display 126 so that touch input can be received at the bezel. Processor 120 can hence be further configured to determine when touch input is received at touchscreen panel 127 at a location that corresponds to an area of display 126, and when touch input is received at touchscreen panel 127 at a location that corresponds to an area of a bezel of display 126.

In some implementations, device 101 further comprises at least one optional input device 128, in addition to touchscreen 125, the at least one input device 128 is generally configured to receive input data, and can comprise any suitable combination of input devices, including but not limited to a keyboard, a keypad, a pointing device, a mouse, a track wheel, a trackball, a touchpad, a touchscreen and the like. Other suitable input devices are within the scope of present implementations.

In any event, input from touchscreen 125 (e.g. touchscreen panel 127), and/or optional at least one input device 128, is received at processor 120, which can be implemented as a plurality of processors, including but not limited to one or more central processors (CPUs).

Processor 120 is configured to communicate with a memory 122 comprising a non-volatile storage unit (e.g. Erasable Electronic Programmable Read Only Memory ("EEPROM"), Flash Memory) and a volatile storage unit (e.g. random access memory ("RAM")). Programming instructions that implement the functional teachings of device 101 as described herein are typically maintained, persistently, in memory 122 and used by processor 120 which makes appropriate utilization of volatile storage during the execution of such programming instructions. Those skilled in the art will now recognize that memory 122 is an example of computer readable media that can store programming instructions executable on processor 120. Furthermore, memory 122 is also an example of a memory unit and/or memory module.

In particular, memory 122 stores at least one application 150, that, when processed by processor 120, enables processor 120 to: detect a sliding touch input at touchscreen 125, the sliding touch input including a change in direction, the sliding touch input terminating in a static touch input proximal an edge of touchscreen 125; and, in response to detecting the static touch input, provide, at display 126, a list of unread messages 140.

At least one application 150 is an example of programming instructions stored at memory 122. For example, at least one application 150 can comprise a combination of a messaging application, a filtering application for filtering messages 140, 141, depending on touch input received at touchscreen 125. In some implementations the messaging application and the filtering application can be combined, while in other implementations the messaging application and the filtering application are distinct from one another.

Processor 120 can be further configured to communicate with optional microphone 134 and speaker 132. Microphone 134 comprises any suitable microphone for receiving sound and converting to audio data. Speaker 132 comprises any suitable speaker for converting audio data to sound to provide one or more of audible alerts, audible communications from remote communication devices, and the like. In some implementations, one or more of input device 128 and touchscreen 125 are external to device 101, with processor 120 in communication with each of input device 128 and/or touchscreen 125 via a suitable connection and/or link.

Processor 120 also connects to communication interface 124 (interchangeably referred to as interface 124), which can be implemented as one or more radios and/or connectors and/or network adaptors, configured to wirelessly communicate with one or more communication networks (not depicted), for example via one or more antennas (not depicted). It will be appreciated that interface 124 is configured to correspond with network architecture that is used to implement one or more communication links to the one or more communication networks, including but not limited to any suitable combination of USB (universal serial bus) cables, serial cables, wireless links, cell-phone links, cellular network links (including but not limited to 2G, 2.5G, 3G, 4G+ such as UMTS (Universal Mobile Telecommunications System), GSM (Global System for Mobile Communications), CDMA (Code division multiple access), FDD (frequency division duplexing), LTE (Long Term Evolution), TDD (time division duplexing), TDD-LTE (TDD-Long Term Evolution), TD-SCDMA (Time Division Synchronous Code Division Multiple Access) and the like), wireless data, Bluetooth™ links, NFC (near field communication) links, WLAN (wireless local area network) links, WiFi links, WiMax links, packet based links, the Internet, analog networks, the PSTN (public switched telephone network), access points, and the like, and/or a combination.

Specifically, interface 124 comprises radio equipment (i.e. a radio transmitter and/or radio receiver) for receiving and/or transmitting signals and/or messages 140, 141. Indeed, in FIG. 1, it is assumed that messages 140, 141 were previously received at device 101 via interface 124 and stored at memory 122.

Device 101 further comprises a power source, not depicted, for example a battery or the like. In some implementations the power source can comprise a connection to a mains power supply and a power adaptor (e.g. an AC-to-DC (alternating current to direct current) adaptor).

In any event, it should be understood that a wide variety of configurations for device 101 are contemplated.

Figure 2:
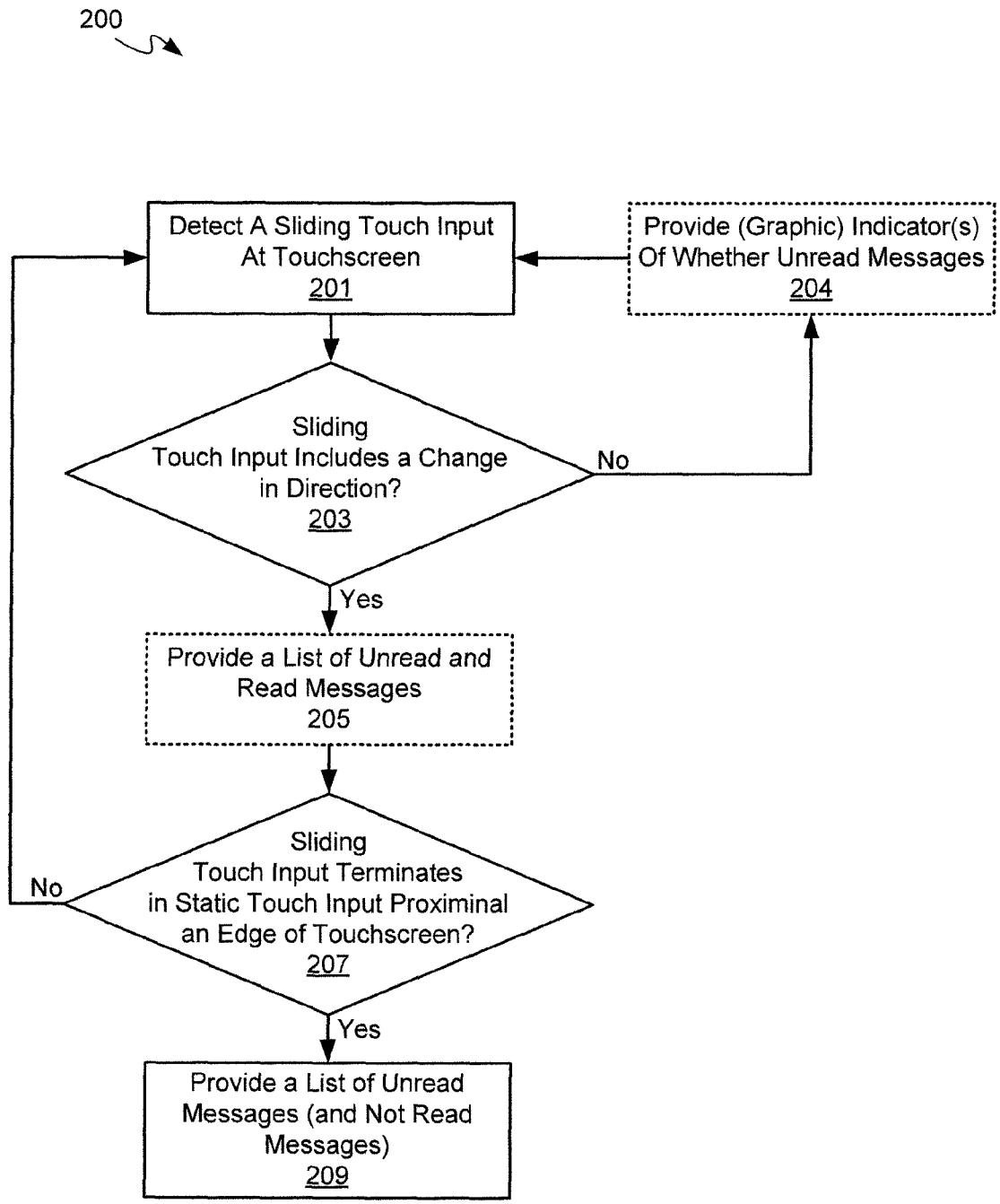
FIG. 2 depicts a block diagram of a flowchart of a method for filtering messages, according to non-limiting implementations.

Attention is now directed to FIG. 2 which depicts a flowchart illustrating a method 200 for filtering messages, according to non-limiting implementations. In order to assist in the explanation of method 200, it will be assumed that method 200 is performed using device 101. Furthermore, the following discussion of method 200 will lead to a further understanding of device 101 and its various components. However, it is to be understood that device 101 and/or method 200 can be varied, and need not work exactly as discussed herein in conjunction with each other, and that such variations are within the scope of present implementations. It is appreciated that, in some implementations, method 200 is implemented in device 101 by processor 120, for example by implementing application 150.

It is to be emphasized, however, that method 200 need not be performed in the exact sequence as shown, unless otherwise indicated; and likewise various blocks may be performed in parallel rather than in sequence; hence the elements of method 200 are referred to herein as "blocks" rather than "steps". It is also to be understood that method 200 can be implemented on variations of device 101 as well.

At block 201, processor 120 detects a sliding touch input at touchscreen 125, for example due to a finger of a user (including, but not limited to, a thumb of the user) sliding on touchscreen 125. At block 203, processor 120 determines and/or detects whether the sliding touch input includes a change in direction, for example due to the finger of the user first sliding in a first direction on touchscreen 125 and then sliding in a second direction on touchscreen 125, in a continuous motion without the finger leaving touchscreen 125, though pauses in movement of finger 301 are within the scope of present implementations, including, but not limited to, a slight pause when finger 301 changes direction. In other words, the finger maintains contact with touchscreen 125 while the sliding touch input is being received. When no change in direction is detected at block 203 (e.g. a "No" decision at block 203), at an optional block 204, processor 120 can provide, at display 126, one or more indicators of one or more of: whether there are unread messages stored at memory 122; and a number of unread messages 140 stored at memory 122, as described below with respect to FIG. 4; in general, such indicators can be graphical indicators and/or iconic indicators. However, block 204 is optional, as indicated by block 204 being drawn in stippled lines; otherwise block 201 is again implemented as processor 120 performs other tasks and waits until sliding touch input is again detected at touchscreen 125. Furthermore, in other implementations, block 204 can be implemented regardless of whether a change in direction is detected at block 203 (i.e. regardless of a "Yes" decision or a "No" decision at block 203).

When a change in direction is detected at block 203 (e.g. a "Yes" decision at block 203), at an optional block 205, processor 120 provides, at display 126, a list of messages 140, 141, the list including at least a portion of unread messages 140 and a portion of read messages 141; for example, the list of messages 140, 141 can comprise one or more of metadata and a subject of each message, provided in rows at display 126, in an order that messages 140, 141 are received. In other words, processor 120 is further configured to, prior to providing a list of read messages 141, provide, at display 126, an initial list of messages 140, 141 during the sliding touch input, the initial list of messages 140, 141 including both messages 140 and the messages designated as read messages 141.

However, block 205 is optional, as indicated by block 205 being drawn in stippled lines. Further, when optional block 204 occurs when a "Yes" decision occurs at block 203, optional block 204 can occur before and/or concurrent with block 205.

Otherwise, at block 207, processor 120 determines whether the sliding touch input terminates in a static touch input proximal an edge of touchscreen 125: for example, the finger stops moving, and continues to touch touchscreen 125, for example for a given period of time, such as more than about half of a second and/or about 1.5 seconds. However, the given period of time over which the static touch input occurs from the edge of touchscreen 125 in order to be considered "static" can be predetermined by one or more of experimentally, heuristically, trial and error, using user interface design software and the like. The given period of time can be stored at one or more of application 150 and memory 122.

When processor 120 determines that the sliding touch input does not terminate in a static touch input proximal an edge of touchscreen 125, (e.g. a "No" decision at block 207), block 201 is again implemented as processor 120 performs other tasks and waits until sliding touch input is again detected at touchscreen 125. For example, a "No" decision can be made at block 207 when either the finger does not maintain contact with touchscreen 125 at the end of the sliding touch input and/or when the static touch input does not occur proximal to an edge of touchscreen 125.

However, when processor 120 determines that the sliding touch input terminates in a static touch input proximal an edge of touchscreen 125, (e.g. a "Yes" decision at block 207), at block 209, in response to detecting the static touch input, processor 120 provides, at display 126, a list of unread messages 140.

A "Yes" decision can be made at block 207 when the finger maintains contact proximal to an edge of touchscreen 125 for the given period of time.

Determining whether the static touch input occurs proximal to an edge of touchscreen 125 can include, but is not limited to, determining whether the static touch input occurs within a given area of touchscreen 125 proximal an edge of touchscreen 125, for example within about 0.5 cm of an edge of touchscreen 125 and/or about 10% from an edge of touchscreen 125. However, the distance from the edge of touchscreen 125 where the static touch input occurs, and/or the area within which that the static touch input occurs, that is considered "proximal" an edge of touchscreen 125 can be predetermined by one or more of experimentally, heuristically, trial and error, using user interface design software and the like. The distance and/or area can be stored at one or more of application 150 and memory 122.

It is further appreciated that method 200 can also comprise applying a first filtering condition to messages 140, 141 when processor 120 determines, at block 203, that the sliding touch input comprises a change in direction and applying a second filtering condition to messages 140, 141 when processor 120 determines, at block 207, that the sliding touch input terminates in a static touch input proximal an edge of touchsereen 125. For example, the first filtering condition can comprise including all messages 140, 141 in a list of messages provided at display 126, while the second filtering condition comprises filtering out read messages 141 from the list of messages provided at display 126, and/or including only unread messages 140 at the list of messages provided at display 126. In other words, processor 120 can be generally configured to: apply a first filtering condition to messages 140, 141 when processor 120 detects a change in direction in a sliding touch input at touchscreen 125, and, in response, provide a list of unread messages 140 and read messages 141 at display 126; and, apply a second filtering condition to messages 140, 141 when processor 120 detects that the sliding touch input terminates in a static touch input proximal an edge of touchscreen 125, and, in response provide a list of unread messages 140 at display 126.

Method 200 is now described with reference to FIGS. 3 to 10 and FIGS. 12 and 13, each of which depict a front perspective view of device 101, including touchscreen 125, display 126 and touchscreen panel 127 (i.e. display 126 is visible through touchscreen panel 127); further, each of FIGS. 3 to 10 and FIGS. 12 and 13 depict graphic user interfaces (GUI) provided at display 126 when circuitry at display 126 is controlled by process 120 to provide representations of messages 140, 141 and/or representations of other data. Further, each of FIGS. 3 to 10 and FIGS. 12 and 13 are substantially similar, with like elements having like numbers.

Figure 3:
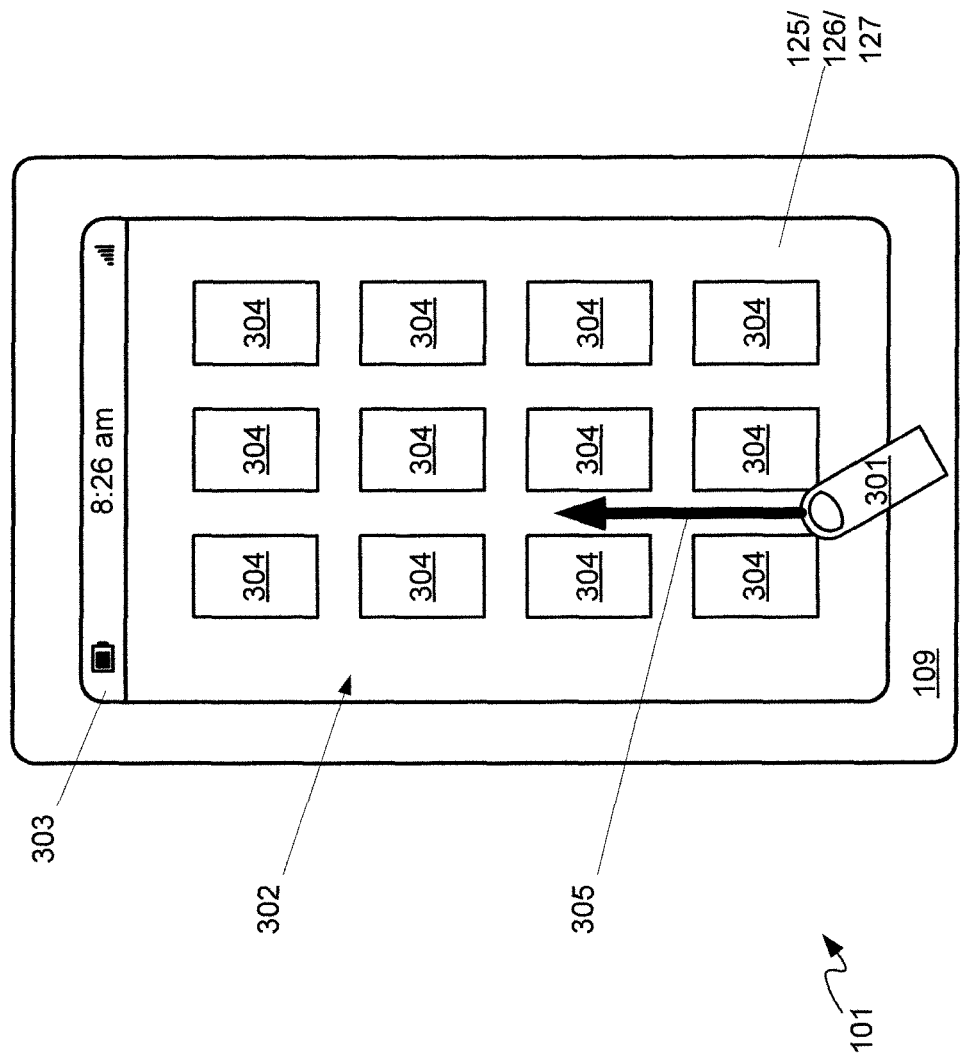
FIG. 3 depicts a perspective view of the device of FIG. 1 showing a Graphic User Interface (GUI) for filtering messages, and a first portion of sliding touch input being received at the device, the sliding touch input used as a trigger for filtering messages, according to non-limiting implementations.

Hence, attention is directed to FIG. 3 which depicts a finger 301 (including, but not limited to, a thumb of a user) interacting with touchscreen 125, as display 126 is controlled to provide a GUI 302. While most of finger 301 is depicted, generally only a tip of finger 301 will touch touchscreen 125.

GUI 302 includes an optional status area 303 located in a "top" and/or header region of GUI 302, the status area 303 including icons and/or indicators of states of various electronic component of device 101, as well as a time of day; for example, as depicted, status area 303 includes a battery indicator and a network indicator. However, a location and content of status area 303 is not to be considered particularly limiting.

GUI 302 further, optionally, includes icons 304, each of which correspond to one or more applications stored at memory 122; a given icon 304 can be designated as selected when static touch input is received at touchscreen panel 127 in an area corresponding to a location of the given icon 304 at display 126; the corresponding application can then be processed by processor 120 and/or "launched".

In general, touchscreen 125 can receive sliding touch input when finger 301 slides on touchscreen 125, for example in a direction of arrow 305: in other words, arrow 305 corresponds to various positions of finger 301 as finger 301 slides on touchscreen 125. Further, processor 120 can detect a corresponding sliding touch input (i.e. block 201) corresponding to finger 301 sliding on touchscreen 125 in direction of arrow 305; indeed, arrow 305 indicates a position of finger 301 at various locations on touchscreen 125 while the sliding touch input is being received. FIG. 3 also illustrates that, in general, sliding touch input represented by arrow 305 starts proximal a bottom of touchscreen 125. However, while the sliding touch input represented by arrow 305 begins approximately midway between a left edge and a right edge of touchscreen 125, the sliding touch input represented by arrow 305 can begin anywhere at touchscreen 125 that allows a change in direction of the sliding touch input to be received, as described hereafter.

Figure 4:
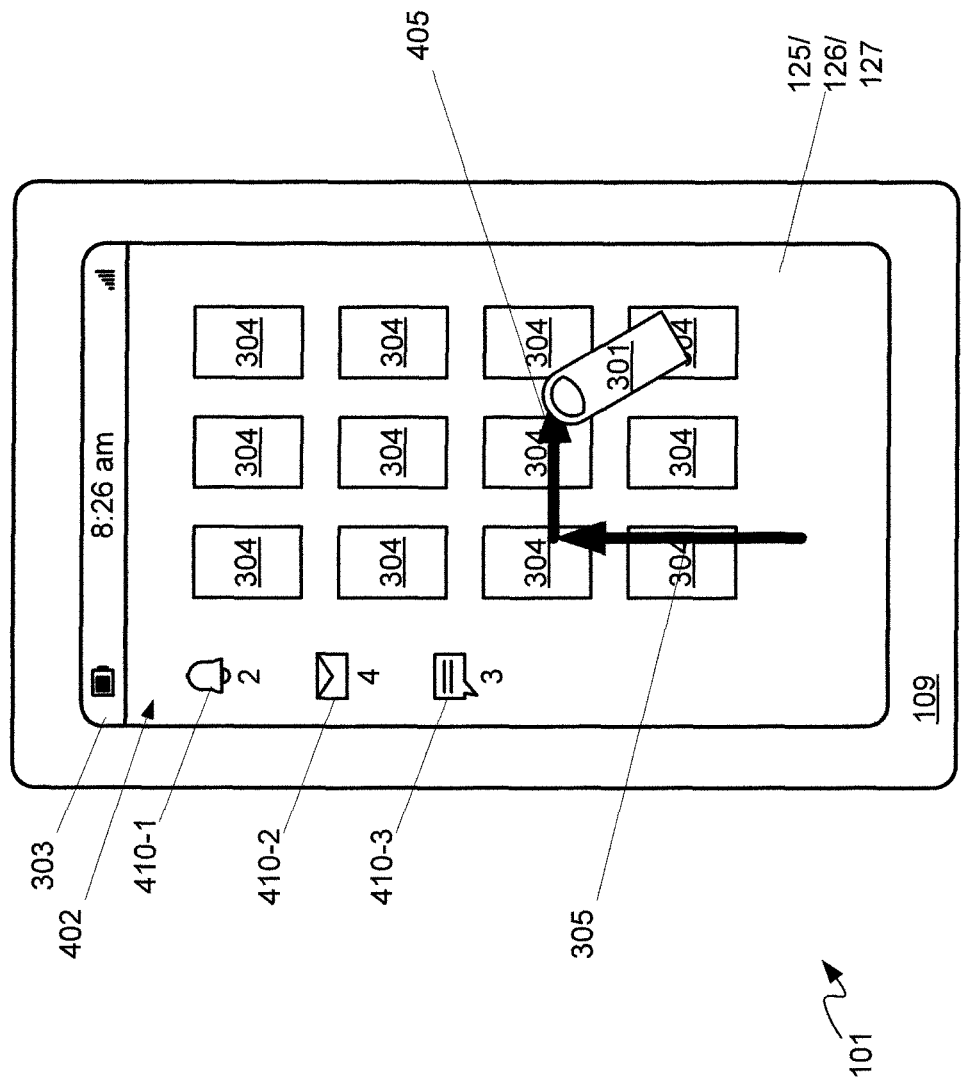
FIG. 4 depicts a perspective view of the device of FIG. 1 showing a GUI for filtering messages, and a second portion of sliding touch input being received at the device, according to non-limiting implementations.

In response, as depicted in FIG. 4, processor 120 changes GUI 302 to GUI 402, for example using animation and the like. FIG. 4 also shows that finger 301 changed direction during the sliding touch input, as indicated by arrow 405. Further, processor 120 can detect a corresponding sliding touch input (i.e. block 201) corresponding to finger 301 sliding on touchscreen 125 in direction of arrow 405; indeed, arrows 305, 405 each indicate a position of finger 301 at various locations on touchscreen 125 while the sliding touch input is being received. Furthermore, arrows 305, 405 also indicate that processor 120 determines that sliding touch input includes a change in direction (a "Yes" decision at block 203). In general, the sliding touch input is received without finger 301 being removed from touchscreen 125.

However, FIG. 4 also depicts a given non-limiting implementation of block 204 of method 200, which can occur whether a change in direction of the sliding touch input indicated by arrows 305, 405 occurs or not. In these implementations, each icon 304, when present, can optionally shrink/become smaller, to make room for indicators 410-1, 410-2, 410-3 which are provided at an edge of touchscreen 125. Indicators 410-1, 410-2, 410-3 will be interchangeably referred to hereafter, collectively, as indicators 410 and generically as an indicator 410.

Indicators 410 generally indicate whether any unread messages 140 are stored at memory 122. When unread messages 140 are stored at memory 122, one or ore indicators 410 are provided; otherwise indicators 410 are not provided. Optionally, each indicator 410 can provide a number of unread messages 140 stored at memory 122.

Furthermore, each indicator 410 can be indicative of whether unread messages 140 are of a given respective type are stored at memory 122 and/or a number of unread messages 140 of a given respective type. For example an indicator 410-1 comprises a graphical icon indicating that there are unread notification messages at memory 122; as depicted, indicator 410-1 also comprises a number of notification messages designated as unread messages. Similarly, an indicator 410-2 comprises a graphical icon indicating that there are unread email messages at memory 122; as depicted, indicator 410-2 also comprises a number of email messages designated as unread messages. Similarly, an indicator 410-3 comprises a graphical icon indicating that there are unread text messages at memory 122; as depicted, indicator 410-3 also comprises a number of text messages designated as unread messages.

Further, while indicators 410 are depicted as being in a particular order and in particular locations (e.g. with indicator 410-1 below indicator 410-2, which is below indicator 410-3, and with indicators on left hand side of display 126), other orders and locations of indicators 410 are within the scope of present implementations. However, in general, indicators 410 are generally provided on display 126 along a direction of sliding touch input represented by arrow 305.

Indicators 410 are generally appreciated to be optional, but can provide a visual guide for numbers of different types of unread messages 140.

Figure 5:
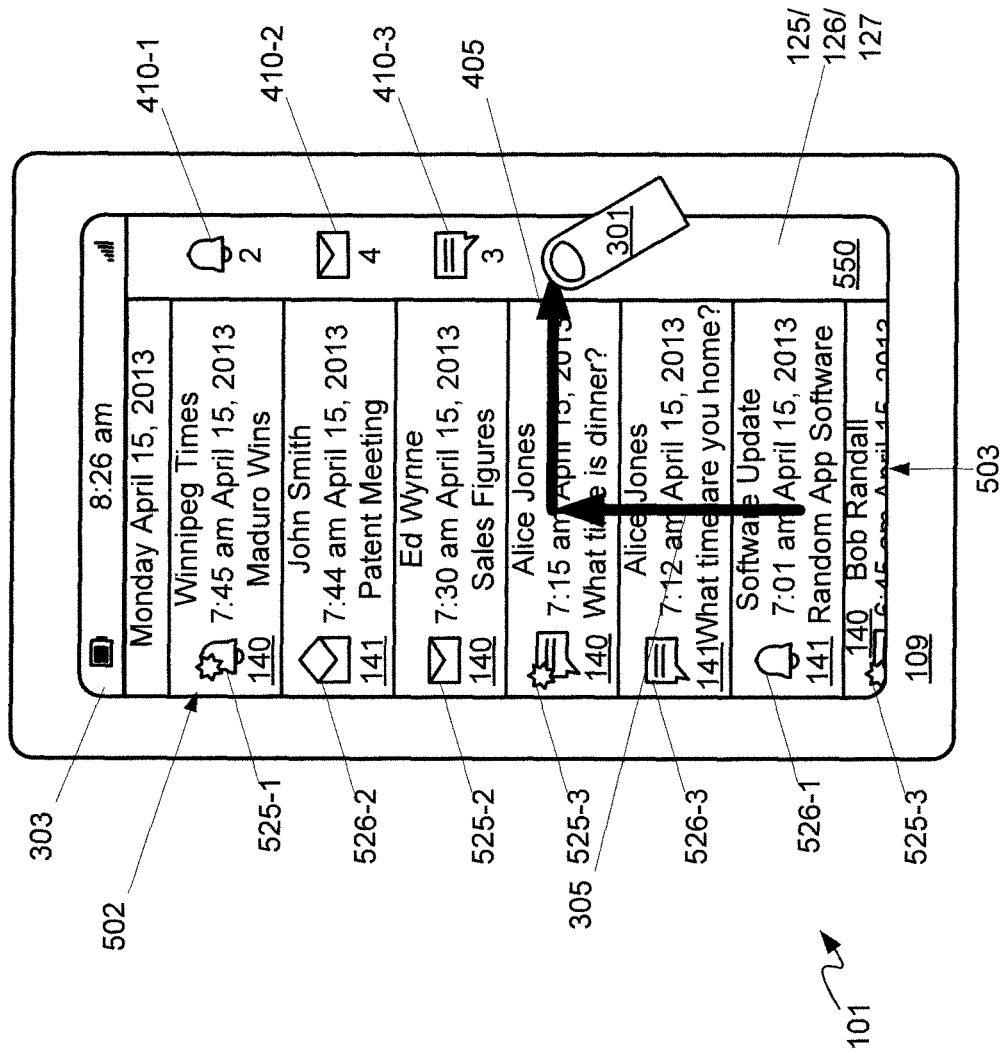
FIG. 5 depicts a perspective view of the device of FIG. 1 showing static touch input being received at the device after a change in direction of sliding touch input is detected, and an optional GUI of unread messages and read messages that is provided when the change in direction of the sliding touch input is detected, according to non-limiting implementations.

In any event, as processor 120 detects a change in direction of the sliding touch input represented by arrows 305, 405, as depicted in FIG. 5, processor 120 optionally changes GUI 402 to GUI 502, for example using animation and the like. FIG. 5 shows that when processor 120 detected the change in direction in the sliding touch input, processor 120 implemented optional block 205 of method 200 to provide an initial list 503 of messages 140, 141 at display 126. Further, processor 120 applied a first filtering condition to messages 140, 141 stored at memory 122 so that both unread messages 140 and read messages 141 are provided in list 503 (i.e. list 503 includes both unread messages 140 and read messages 141). It is appreciated that each message 140, 141 in initial list 503 is provided in a respective row and/or rows (as depicted, three rows for each message 140, 141, however the number of rows dedicated to each message 140, 141 can be adjustable, for example based on font size of text in each row and/or configurable, for example using a pulldown menu and the like).

Further, each message 140, 141 is represented in list 503 by one or more of respective metadata associated with each message 140, 141, and a subject of each message 140, 141. For example, each row of initial list 503 comprises metadata of a respective message 140, 141 including, but not limited to, a time and/or date that a respective message 140, 141 was received, a subject of a respective message 140, 141, and an identifier of a sender of a respective message 140, 141, a type of a given message 140, 141 (e.g. "Software Update") and the like. When a respective message 140, 141 comprises a text message, data provided for a respective message 140, 141 in initial list 503 can also comprise at least a portion of the text of the text message that can fit on one row of list 503. Further the type of data displayed in each row for each message 140, 141 can be one or more of configurable and respective to a given type of a respective message 140, 141.

Data provided for a respective unread message 140 in initial list 503 can also comprise a respective icon 525-1, 525-2, 525-3 indicative, respectfully, of an unread notification message, an unread email message and an unread text message; similarly, data provided for a respective read message 141 in initial list 503 can also comprise a respective icon 526-1, 526-2, 526-3 indicative, respectfully, of a read notification message, a read email message and a read text message. Icons 525-1, 525-2, 525-3 will be interchangeably referred to hereafter, collectively, as icons 525 and generically as an icon 525. Similarly, icons 526-1, 526-2, 526-3 will be interchangeably referred to hereafter, collectively, as icons 526 and generically as an icon 526. Each icon 525 is similar to a respective icon 526, however with a graphical change thereto; while the changes between icons 525, 526 are depicted as differences in shape, in other implementations, icons 525, 526 can be differentiated by changes in color, shading and the like.

Not all messages 140, 141 need be provided at display 126 in initial list 503; rather, initial list 503 can be "slidable" so that a user can select initial list 503 using finger 301 and "slide" list 503 "up" or "down" to reveal further messages 140, 141 not initially displayed at display 126. The terms "top", "above", "up", "bottom", "below, "down", as used herein, are understood to be relative to touchscreen 125 and/or display 126, and are not meant to mean "up" and "down", and the like, with respect to the ground. For example, device 101 can be held horizontally and a user can slide list "up" relative to touchscreen 125 and/or display 126 (e.g. away from user) or "down" relative to touchscreen 125 and/or display 126 (e.g. towards user). For example, while indicators 410-1, 410-2, 410-3 respectively indicate that there are two unread notification messages, four unread email messages and three unread text messages, only one unread notification, one unread email message and two unread text messages (the last partially hidden at an end of list 503) are depicted in list 503, the remaining unread messages accessible by sliding list 503 "up".

In any event, FIG. 5 also depicts that processor 120 is further configured to, prior to providing a list of unread messages 141, provide, at display 126, an initial list 503 of messages 140, 141 during the sliding touch input, the initial list of messages 140, 141 including both unread messages 140 and the messages designated as read messages 141. In specific non-limiting implementations processor 120 can be further configured to: provide initial list 503 of messages 140, 141 when the change in direction detected. For example, when finger 301 changes direction from arrow 305 to arrow 405, list 503 can be provided so that, to a user, it appears that finger 301 is "pulling" list 503 over from an edge of touchscreen 125 in an opposite direction of arrow 405 (e.g. from left to right): i.e. in specific non-limiting implementations, list 503 can be animated to slide onto display 126 in a direction of arrow 405.

In depicted implementations, indicators 410 continue to be provided at display 126, however, they are moved to an opposite side of touchscreen 125 than in GUI 402, in a direction of arrow 405. Specifically, indicators 410 are provided in a bar 550 located at an edge of display 126 located in a direction of arrow 405 so that, to a user, it appears that indicators 410 are being pulled by finger 301 from first edge of display 126, as in FIG. 4, to an opposite edge of display 126, as in FIG. 5 (e.g. from left to right).

FIG. 5 also shows that finger 301 has remained static when the sliding touch input represented by arrows 305, 405 terminates, such that the sliding touch input terminates in a static touch input, proximal an edge of touchscreen 125 that is in a direction of arrow 405 and/or in bar 550 (e.g. a right edge): in other words, in these implementations, bar 550 graphically defines the area of touchscreen 125 that is considered to be proximal to an edge of touchscreen 125. Bar 550 hence acts as a graphical guide to where finger 301 can terminate the sliding touch input in order to cause filtering of messages 140, 141 so that initial list 503 is modified to show unread message 140 and/or messages 140, 141 are filtered according to a second filtering condition to show unread messages 140. It is nonetheless appreciated that bar 550 and indicators 410 are optional.

In some implementations, any detected touch input outside of bar 550 and/or the area proximal an area of the static touch input is ignored so that accidental touching of touchscreen 125 outside of bar 550 does not result in unwanted action of processor 120.

In some implementations providing list 503 is optional, and the static touch input is received at GUI 402 of FIG. 4 and/or GUI 302 of FIG. 3 without providing list 503 and/or indicators 410.

Figure 6:
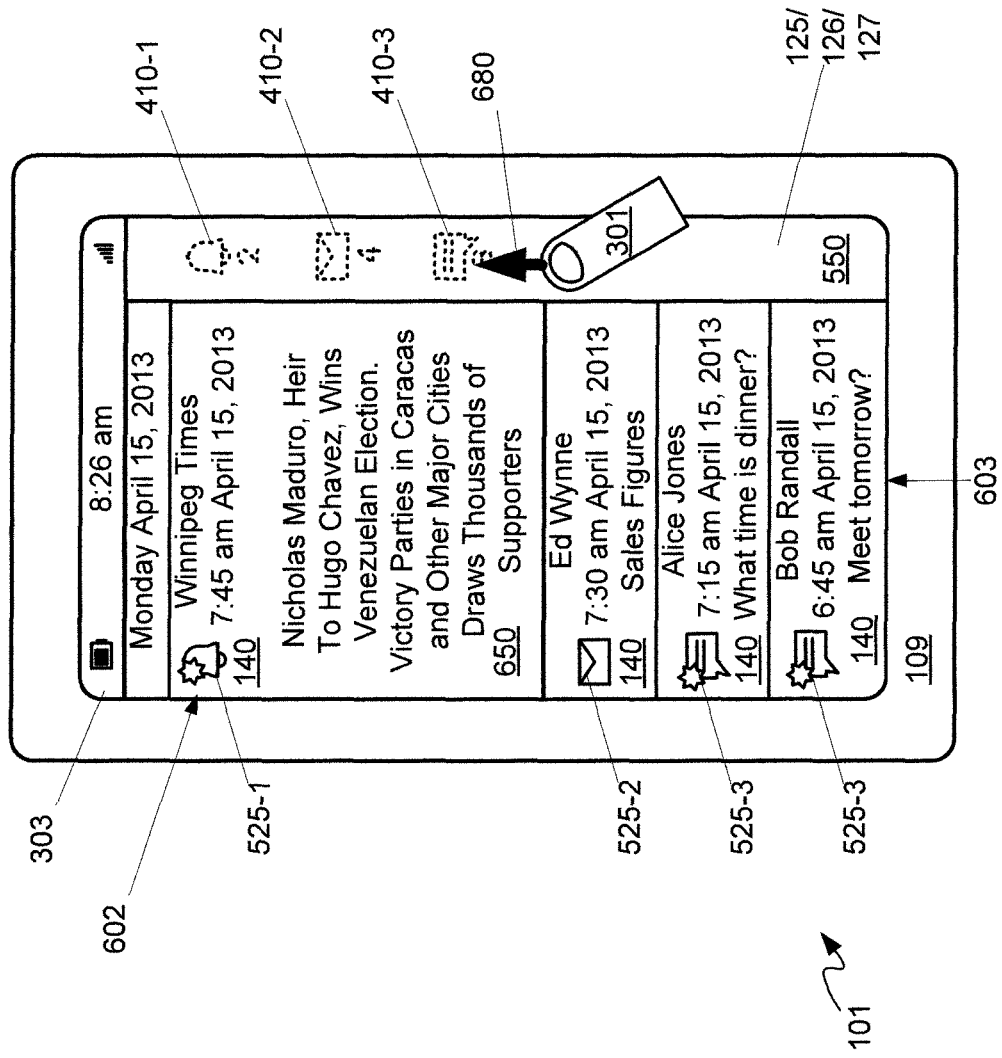
FIG. 6 depicts a perspective view of the device of FIG. 1 showing a resulting GUI of unread messages that is provided when the static touch input terminates the sliding touch input, according to non-limiting implementations.

In response to processor 120 detecting that the sliding touch input terminates in static touch input proximal an edge of touchscreen 125 (i.e. a "Yes" decision at block 207), as depicted in FIG. 6, processor 120 changes GUI 502 to GUI 602, for example using animation and the like. Further, in response to processor 120 detecting that the sliding touch input terminates in static touch input proximal an edge of touchscreen 125 (i.e. a "Yes" decision at block 207), processor 120 provides, at display 126, a list 603 of unread messages 140. For example, in response to processor 120 detecting that the sliding touch input terminates in static touch input proximal an edge of touchscreen 125 (i.e. a "Yes" decision at block 207), processor 120 applies a second filtering condition to messages 140, 141, the second filtering condition comprising filtering out read messages 141 from initial list 503 of messages 140, 141 provided at display 126, to provide list 603, and/or including only unread messages 140 at list 603 of messages provided at display 126.

Hence, unread messages 141 are not provided at list 603 as read messages 141 have been filtered from list 603, as compared to list 503.

Similar to list 503, list 603 can be slidable and the like, so that further unread messages 140 can be accessed by sliding list 603 "down".

In implementations that include indicators 410, indicators 410 can be blurred (as indicated by indicators 410 being drawn in stippled lines in FIG. 6) or removed from display 126.

In some implementations, when list 603 is provided, rows of list 603 are similar to rows of list 503, as described above, but include data associated with unread messages 140 and not read messages 141.

In other implementations, processor 120 is further configured to, in response to detecting the static touch input, provide, at display 126, a preview 650 of a given unread message 140, in list 603 of unread messages, when providing list 603 of unread messages 140. For example, as depicted, a preview 650 of a first unread message 140 in list 603 is provided. Preview 650 can include, but is not limited to, one or more of metadata associated with the given unread message 140 and a subject of the given unread message 140; and, at least a portion of a body of the unread message 140, for example text from a body of the given unread message 140. In contrast to preview 650, data provided in list 603 for each of the other unread messages 140 comprises only one or more of respective metadata and a respective subject, and, in the instance of text messages, a portion of the body that can fit on one line of a row of list 603.

A size of an area of preview 650 can be determined automatically by processor 120, for example based on configurable parameters at device 101, which can be stored at one or more of application 150 and memory 122. For example, a given number of lines of text of a body of a respective unread message 140 can be provided in preview 650; and/or a size of a font of text of a body of a respective unread message 140 can be changed so that all the text fits on display 126; and/or text of a body of a respective unread message 140 in preview 650 can be scrollable using further sliding touch input; and/or only a portion of text of a body of a respective unread message 140 that fits on display 126 can be provided. It should be understood that a wide variety of configurations for preview 650 are contemplated.

Hence, by the use of a combination of sliding and static gestures that can be implemented with one hand, filtering conditions can be applied to messages 140, 141 that include filtering out read messages 141 so that unread messages 140 are provided in a list 603 at display 126. However, further navigation of list 603 can occur from the static position of finger 301 depicted in FIG. 6.

For example, FIG. 6 also depicts an arrow 680, which represents a further sliding touch input beginning at a position of the static touch input. In these implementations, processor 120 can be further configured to, in response to detecting the further sliding touch input beginning at a position of the static touch input: when the further sliding touch input is in a first direction relative to the position of the static touch input, provide, at display 126, a preview of a next unread message 140 in list 603 of unread messages 140; and, when the further sliding touch input is in a second direction opposite the first direction, provide, at display 126, a preview of a previous unread message 140 in list 603 of unread messages 140.

Figure 7:
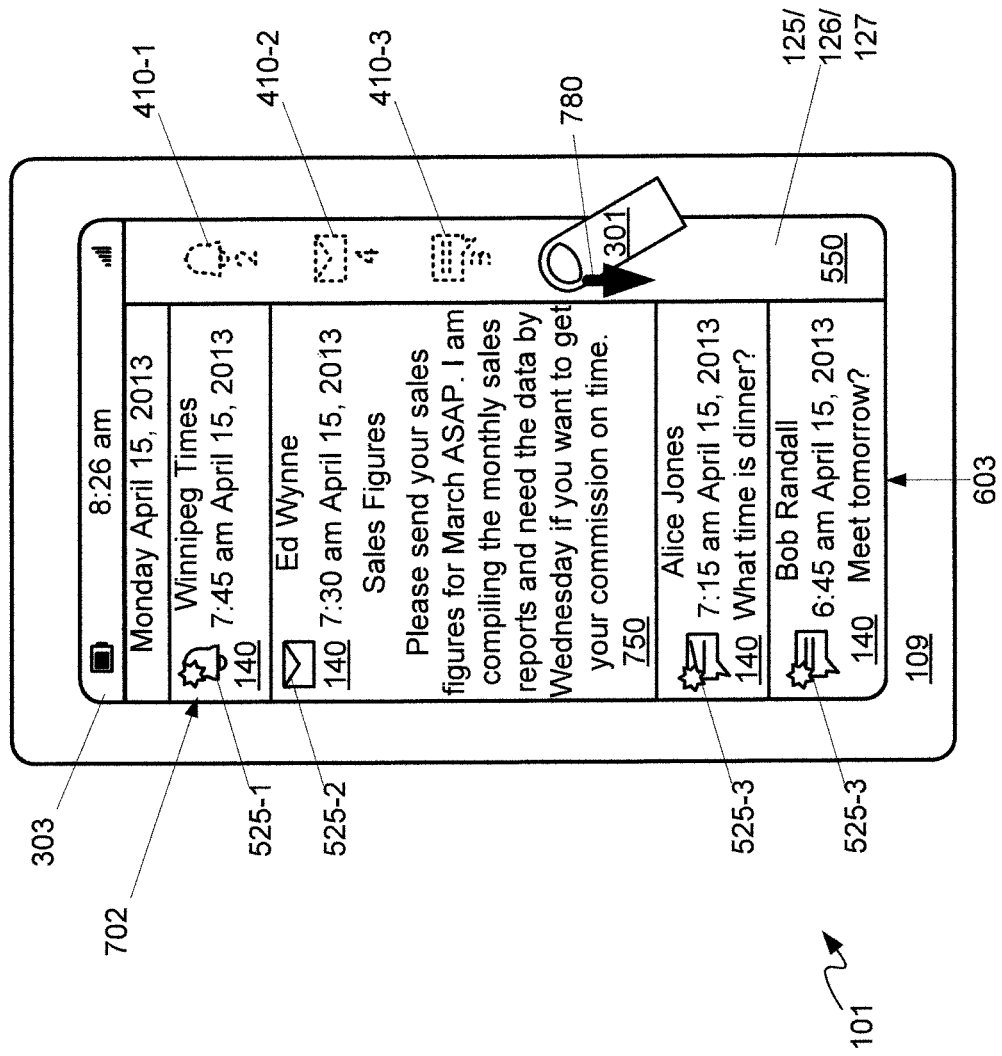
FIG. 7 depicts a perspective view of the device of FIG. 1, and navigation of the GUI of FIG. 6, according to non-limiting implementations.

For example, attention is directed to FIG. 7, which depicts a GUI 702: processor 120 changes GUI 602 to GUI 702, for example using animation and the like, when further sliding touch input represented by arrow 680 is received. The further sliding touch input can be one or more of: generally perpendicular to the sliding touch input represented by arrow 405; in an "up" direction relative to touchscreen 125 and/or display 126; and/or in a "down" direction relative to touchscreen 125 and/or display 126. However, the further sliding touch input being "up" and "down" can have different results at display 126.

As depicted, arrow 680 is "up"; in these implementations, when the further sliding touch input is "up" relative to the position of the static touch input and/or when the further sliding touch input is in a first direction relative to the position of the static touch input, a preview of a next unread message 140 in list 603 of unread messages 140, is provided. For example, in FIG. 7 a preview 750 of a second unread message 140 in list 603 is provided, with processor 120 removing preview 650 from display 126. Preview 750 is similar to preview 650 but respective to the second unread message 140 in list 603.

In some implementations, the sliding touch input represented by arrow 680 can be followed by a return to a position of the static touch input, so that a user flicks finger 301 "up" and then back "down" to the initial position of finger 301 in order to navigate list 603 to a next unread message 140. Hence, an "up-down" movement can be used to navigate to next unread message 140 in list 603.

When yet a further sliding touch input is received, similar to the further sliding touch input represented by arrow 680, a preview of a third unread message 140 in list 603 can be provided, and so on. When the last unread message 140 provided at display 126 is reached (e.g. at a bottom of display 126), and there are further unread messages 140 not yet provided at display 126 (e.g. due to limited space at display 126), then processor 120 can automatically slide list 603 to show the further unread messages 140, and previews thereof can be provided in sequence.

FIG. 7 further depicts an arrow 780, in an opposite direction to arrow 680, which represents a further sliding touch input beginning at a position of the static touch input. Arrow 780 is hence in a "down" direction and, in these implementations, when the further sliding touch input is "down" relative to the position of the static touch input and/or when the further sliding touch input is in a second direction opposite the first direction (i.e. of arrow 680), processor 120, provides, at display 126, a preview of a previous unread message 140 in list 603 of unread messages 140.

For example, when further sliding touch input corresponding to arrow 780 is received at touchscreen 125, while preview 750 of the second unread message 140 is being provided, processor 120 can change GUI 702 back to GUI 602, for example using animation and the like. Similarly, when yet a further sliding touch input is received, similar to the further sliding touch input represented by arrow 780, a preview of a given unread message 140 currently being provided can be replaced by a preview of a previous unread message 140. In this manner list 603 can be navigated to provide previews of unread messages 140.

In some implementations, the sliding touch input represented by arrow 780 can be followed by a return to a position of the static touch input, so that a user flicks finger 301 "down" and then back "up" to the initial position of finger 301 in order to navigate list 603 to a previous unread message 140. Hence, a "down-up" movement can be used to navigate to next unread message 140 in list 603.

Alternatively, when no previews are provided, sliding touch input corresponding to arrows 680, 780 can be used to "slide" list "up" and "down" relative to one or more of touchscreen 125 and display 126.

In yet further implementations, a "down-up" movement can be used to navigate to a next unread message 140 in list 603, while an "up-down" movement can be used to navigate to a previous unread message 140 in list 603.

Figure 8:
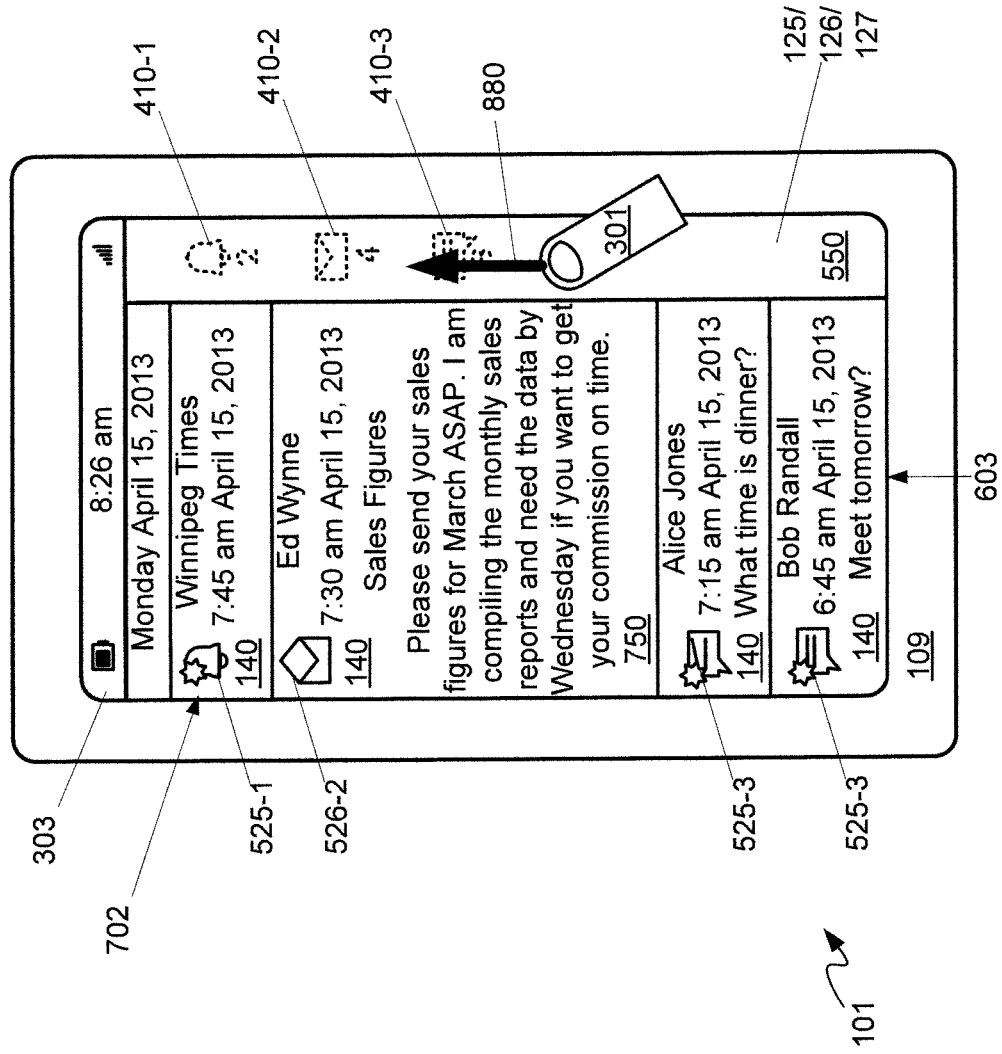
FIG. 8 depicts a perspective view of the device of FIG. 1 and a further sliding touch input being received, that results in an unread message being designated as read, according to non-limiting implementations.
Figure 9:
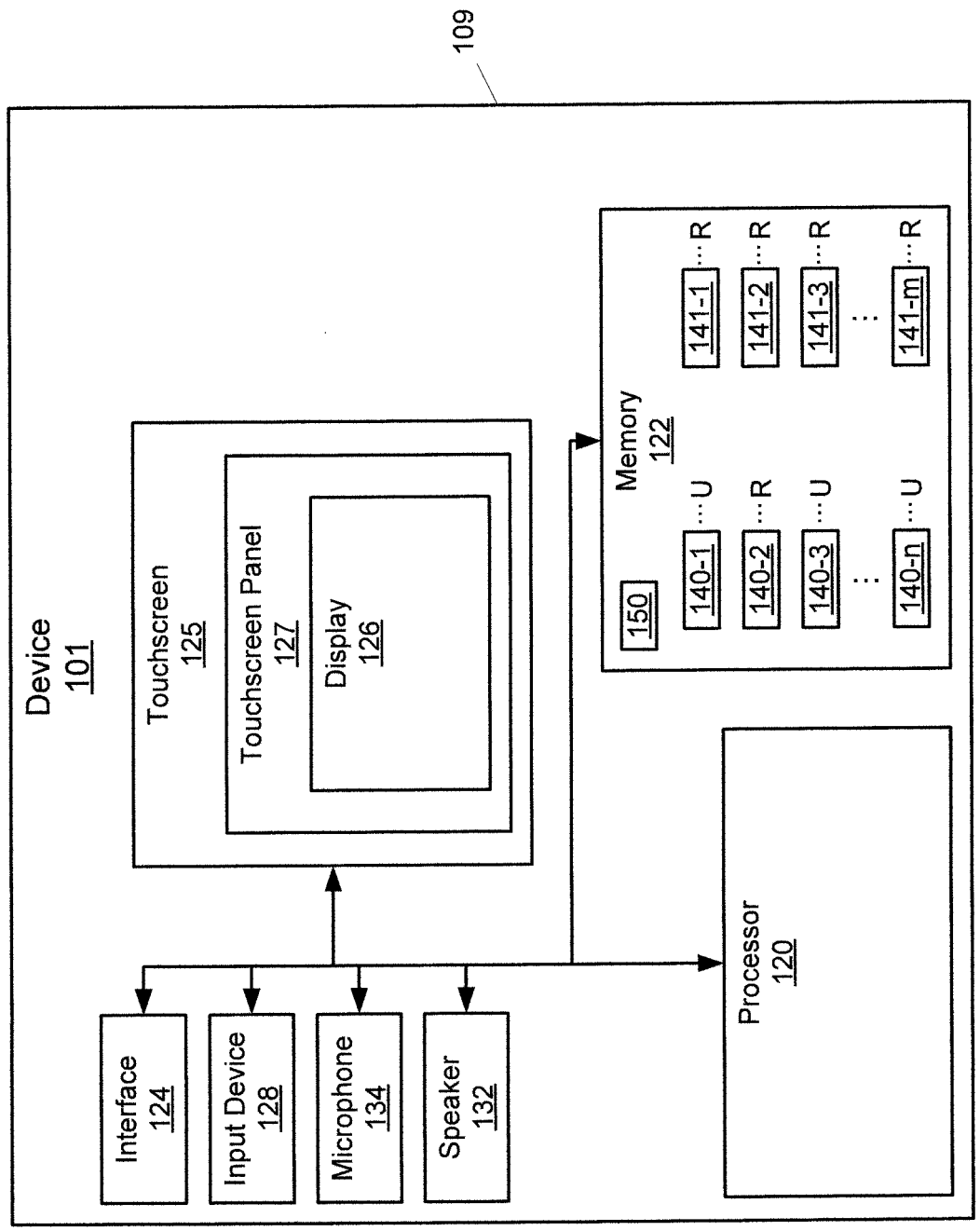
FIG. 9 depicts the device of FIG. 1 and a processor thereof changing a designation of a message from unread to read at a memory of the device, according to non-limiting implementations.

Attention is next directed to FIG. 8, which is similar to FIG. 7 with like elements having like numbers. Like FIG. 7, in FIG. 8 preview 750 is being provided at display 126. FIG. 8 also depicts an arrow 880 representative of a further sliding touch input that occurs in a length of time greater than a threshold period of time (e.g. above a given threshold speed). As with sliding touch inputs represented by arrows 680, 780, the further sliding touch input represented by arrow 880 can be accompanied by a return to the initial position of the static touch input. The threshold period of time (and/or a given threshold speed) can be determined by one or more of experimentally, heuristically, heuristically, trial and error, using user interface design software and the like, and stored at one or more of application 150 and memory 122. In any event, the further sliding touch input represented by arrow 880 can be indicative of a command to mark a respective message as unread. In other words, processor 120 can be further configured to, when a given change in position of the further sliding touch input occurs in a length of time greater than a threshold time period, designate a respective one of the unread messages 140 at list 603 as a read message.

For example, in FIG. 8, as the second unread message 140 in list 603 is being previewed at list 603 (i.e. preview 750 is provided, as described above), when the further sliding touch input represented by arrow 880 is received, the second unread message 140 is then designated as a read message as indicated by a change of an associated icon 525-2 to icon 526-2. Further, with reference to FIG. 9, substantially similar to FIG. 1, with like elements having like numbers, processor 120 changes a designator of message 140-2 from "U" to "R", indicating that message 140-2 is designated as a read message. In some implementations, the second message in list 603 (now a read message) can be removed from list 603, but not deleted from memory 122.

Hence, a rapid (i.e. a given change in position that occurs in a given period of time) "upward" (and then "downward") movement of finger 301 can be used to change a status of an unread message 140 to a read message.

Figure 10:
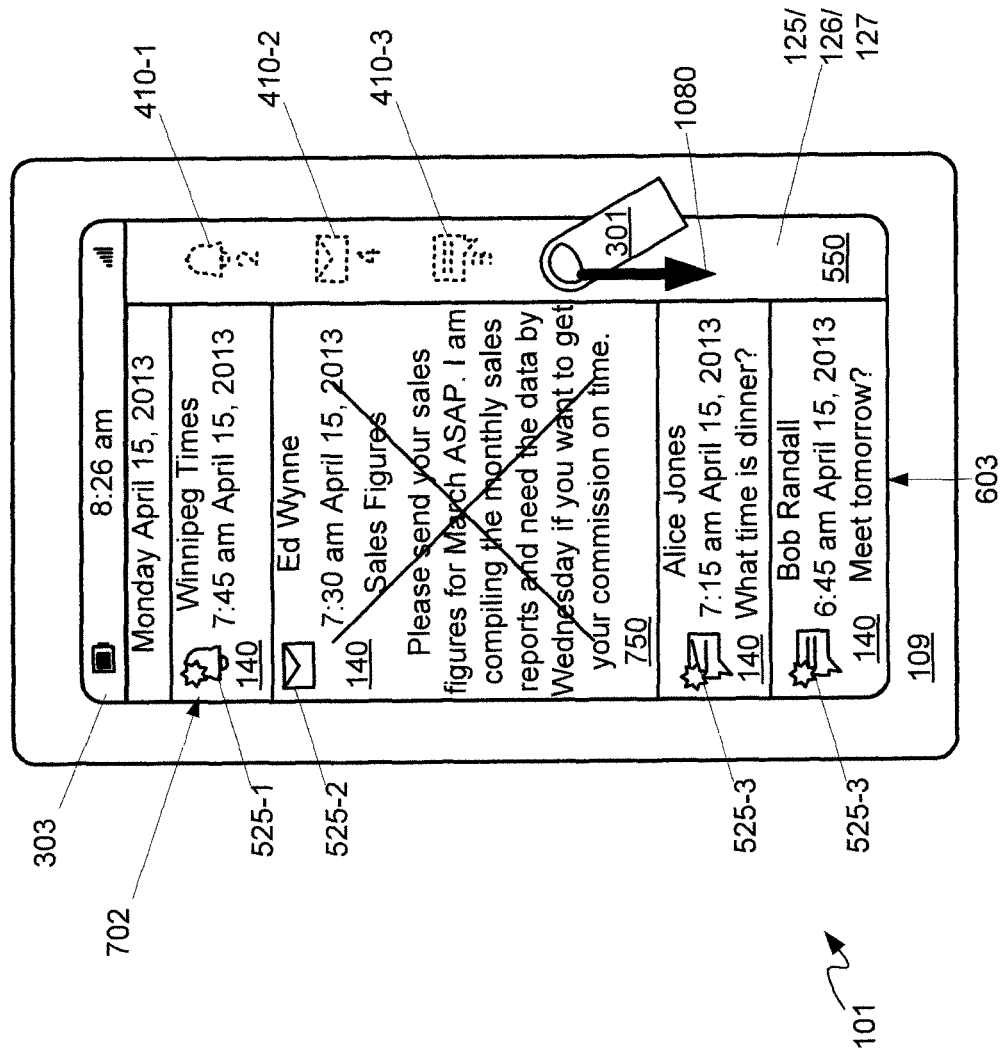
FIG. 10 depicts a perspective view of the device of FIG. 1 and a further sliding touch input being received, that results in an unread message being deleted, according to non-limiting implementations.

Alternatively, and/or in combination with the implementation of FIG. 8, a further sliding touch input can be used to delete a message in list 603. For example, attention is next directed to FIG. 10, which is similar to FIG. 7 with like elements having like numbers. As with FIG. 7, in FIG. 10 preview 750 is being provided at display 126. FIG. 10 also depicts an arrow 1080 representative of a further sliding touch input that occurs in a length of time greater than a threshold period of time (e.g. above a given threshold speed). As with sliding touch inputs represented by arrows 680, 780, the further sliding touch input represented by arrow 1080 can be accompanied by a return to the initial position of the static touch input. The threshold period of time (and/or threshold speed) can be determined by one or more of experimentally, heuristically, trial and error, using user interface design software and the like, and stored at one or more of application 150 and memory 122. In any event, the further sliding touch input represented by arrow 1080 can be indicative of a command to delete a message. In other words, processor 120 can be further configured to, when a given change in position of the further sliding touch input occurs in a length of time greater than a threshold time period, delete, at memory 122, a respective one of the unread messages 140 in list 603.

Figure 11:
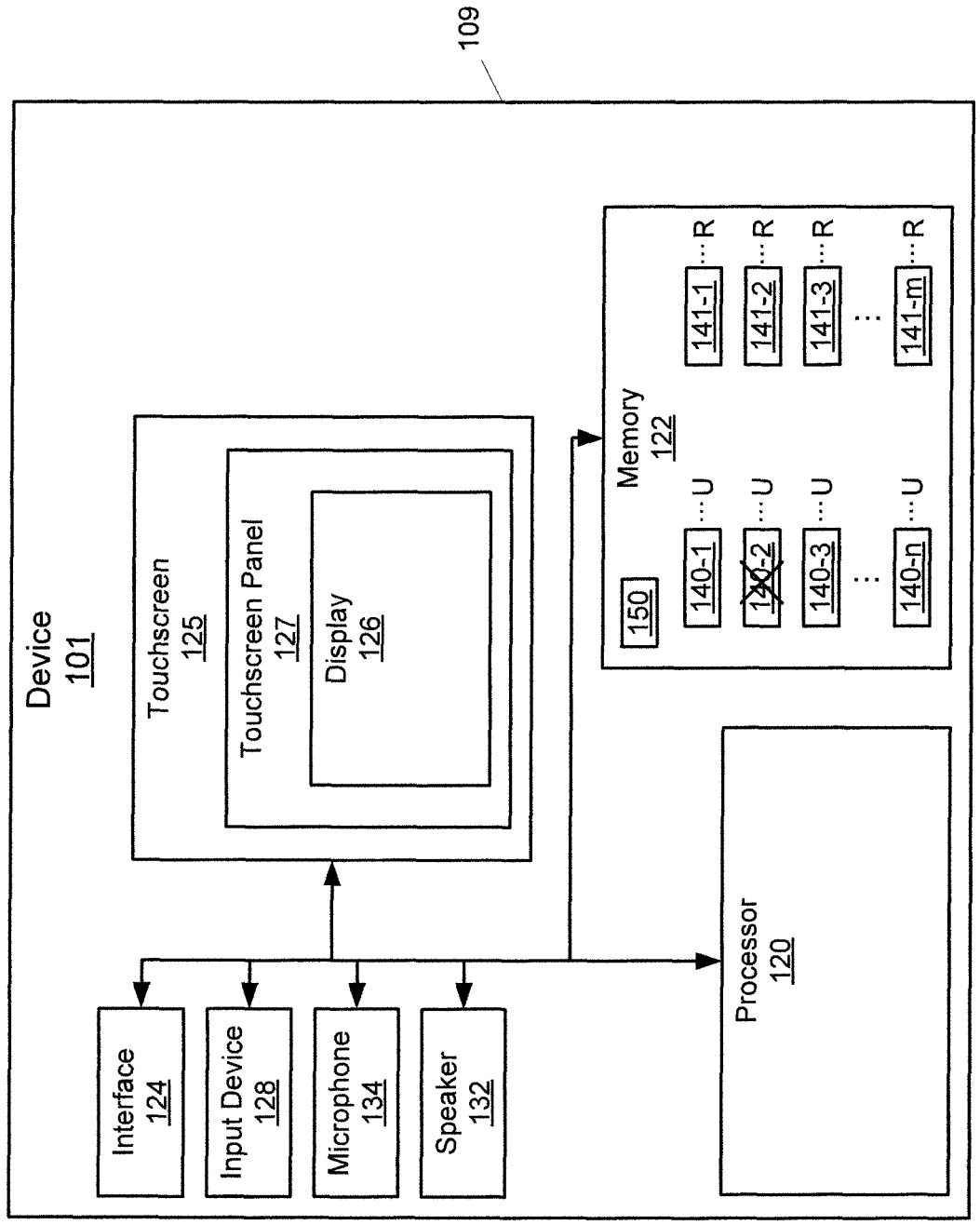
FIG. 11 depicts the device of FIG. 1 and a processor thereof deleting an unread message at a memory of the device, according to non-limiting implementations.

For example, in FIG. 10, as the second unread message 140 in list 603 is being previewed at list 603 (i.e. preview 750 is provided, as described above), when the further sliding touch input represented by arrow 1080 is received, the second unread message 140 is then deleted, as indicated by the "X" through the second unread message 140 in list 603, which is subsequently removed from list 603. Further, with reference to FIG. 11, substantially similar to FIG. 1, with like elements having like numbers, processor 120 deletes unread message 140-2 from memory 122, as indicated by the "X" through the second unread message 140-2.

Hence, a rapid (i.e. a given change in position that occurs in a given period of time) "downward" (and then "upward") movement of finger 301 can be used to delete an unread message 140 from memory 122 and list 603.

Figure 12:
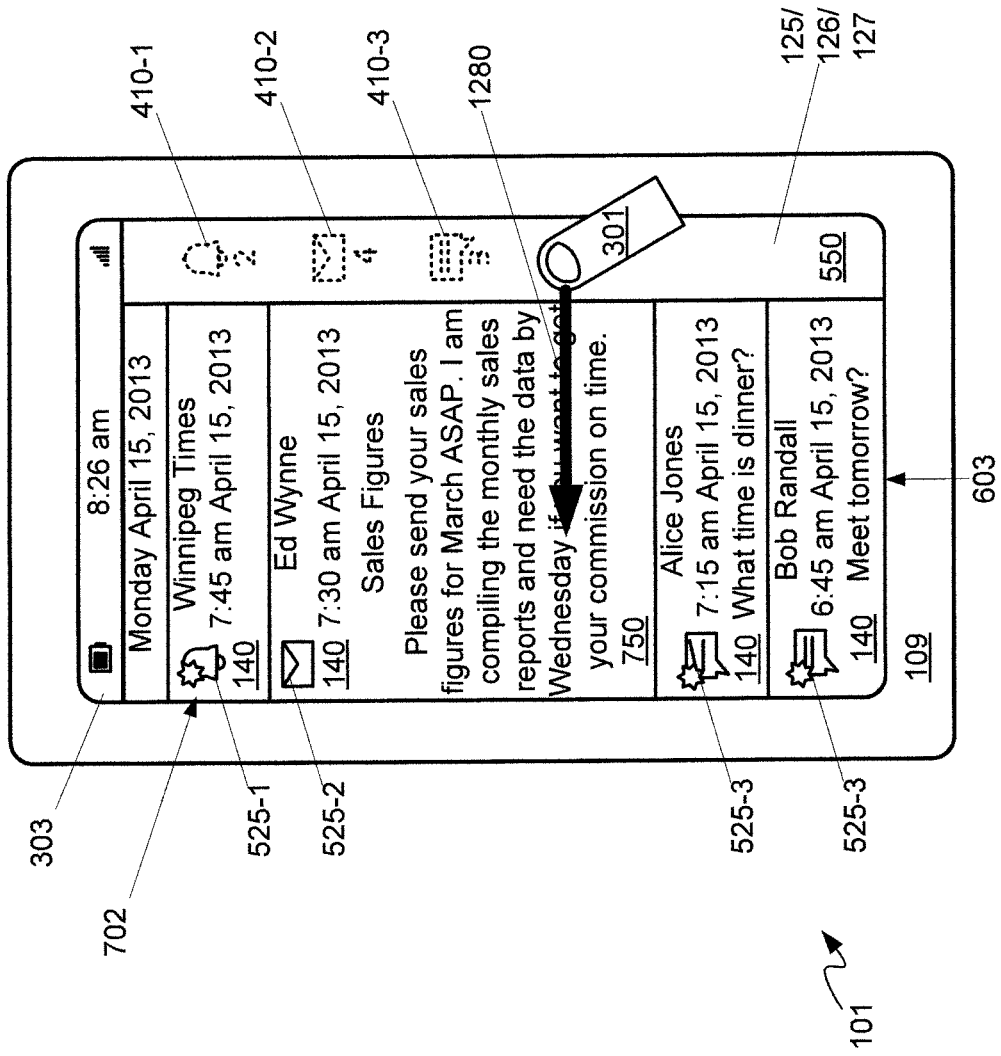
FIG. 12 depicts a perspective view of the device of FIG. 1, and a further sliding touch input being received that results in a return to the GUI of FIG. 5, according to non-limiting implementations.

Attention is next directed to FIG. 12, which is similar to FIG. 7 with like elements having like numbers. FIG. 12 depicts an arrow 1280 representative of another sliding touch input in a direction opposite arrow 405. Specifically, as has already been described, a first portion of the initial sliding touch input represented by arrow 305 is in a first direction and a second portion of the initial sliding touch input represented by arrow 405 is in a second direction. Further the second portion of the initial sliding touch input represented by arrow 405 can cause list 503 to appear to "slide" onto display 126 in a direction of arrow 405 (e.g. left to right). Hence, to return to list 503, processor 120 can be further configured to: after the static touch input described above with respect to FIGS. 5 and 6 is detected, detect another sliding touch input, for example as represented by arrow 1280, beginning at a position of the static touch input, in an opposite direction to the second direction, as represented by arrow 405; and, in response, replace, at display 126, list 603 of unread messages 140 with initial list 503 of messages 140. In other words, processor 120 replaces GUI 702 (or GUI 602 when another sliding touch input in a direction of arrow 1280 is received while GUI 602 is being provided), with GUI 502, using animation or the like, when another sliding touch input in a direction of arrow 1280 is received.

Persons skilled in the art will appreciate that there are yet more alternative implementations and modifications possible. For example, in some implementations, any detected "left" or "right" touch input received at bar 550 and/or the area proximal an area of the static touch input is ignored so that accidental touching of touchscreen 125 "left" or "right" does not result in unwanted action of processor 120, left and right being relative to one or more of touchscreen 125 and display 126. Alternatively, left and right touch input can be used to alternatively designate a respective unread message 140 as a read message and/or delete a respective unread message 140.

Figure 13:
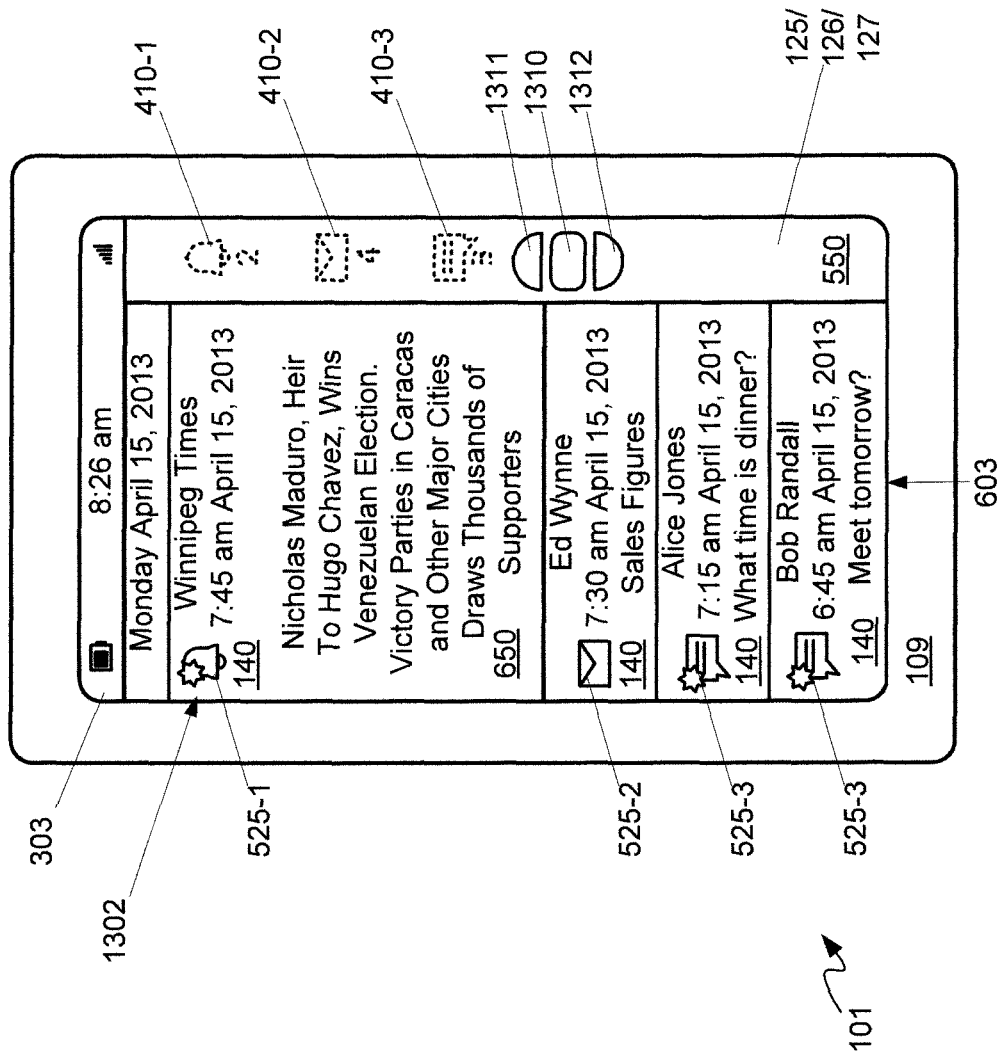
FIG. 13 depicts a perspective view of the device of FIG. 1 showing an alternative GUI of unread messages that is provided when static touch input terminates the sliding touch input, the GUI including icons and/or virtual buttons for navigating the unread messages, according to non-limiting implementations.

Other configurations for navigating list 603 are within the scope of present implementations. For example, attention is next directed to FIG. 13, which is substantially similar to FIG. 6, with like elements having like numbers. FIG. 13 depicts an alternative GUI 1302 provided at display 126 in response to processor 120 detecting a sliding touch input at touchscreen 125, the sliding touch input including a change in direction, the sliding touch input terminating in a static touch input proximal an edge of touchscreen 125. In other words, GUI 1302 is an alternative to GUI 602. It is assumed in FIG. 13 that finger 301, or the like, has caused the sliding touch input corresponding to arrows 305, 405 to be received at device 101, and that the sliding touch input terminates in static touch input, as described above. However, finger 301 is not depicted in FIG. 13 for clarity, though finger 301 is assumed to be nonetheless present.

GUI 1302 is substantially similar to GUI 602, however GUI 1302 further comprises proximal a position of the static touch input (i.e. a position of tip of finger 301), one or more of: a first icon 1310 indicative that the list of unread messages can be navigated and/or a position of an area associated with the static touch input; a second icon 1311 indicative that list 603 of unread messages 140 can be navigated to preview a next unread message 140; and, a third icon 1312 indicative that list 603 of unread messages 140 can be navigated to preview a previous unread message 140. Icon 1310 can, in some implementations, be simply an un-actuatable indicator of unread messages 140 being provided at display 126 and/or device 101 being in an unread message mode. Each icon 1311, 1312 can comprise actuatable virtual buttons and/or controls for navigating list 603. Icon 1311 can comprise a control for navigating to a next unread message 140 and optionally providing a preview thereof. Icon 1312 can comprise a control for navigating to a previous unread message 140 and optionally providing a preview thereof. In some implementations icon 1310 can also comprise an actuatable virtual button and/or control, for example one or more of designating a respective unread message 140 as a read message; deleting a respective unread message 140; returning to a given position of list 603, and the like. In some implementations an action associated with each of icons 1310, 1311, 1312 can be configurable.

In yet further implementations, when no touch input is received, after the terminating static touch input is received, GUI 502 can again be provided. In other words, when a user lifts finger 301 off of touchscreen 125, list 603 is replaced with list 503.

Provided herein is a device configured to filter messages when a series of touch gestures are detected at the device as sliding touch input that includes a change in direction and terminates with static touch input. The change in direction of the sliding touch input causes a processor of the device to responsively filter and/or select all of messages, while the terminating static touch input causes the processor to filter out the unread messages and provide the unread messages in a list at the display. Such a device can be particularly useful when the device is a mobile electronic device and/or mobile communications device that can be held and operated with one hand. For example, the thumb of the hand can be used to provide the touch input. The series of touch gestures has also been found to be more ergonomic for one-handed operation than using menus and/or search options for accessing unread messages.

Those skilled in the art will appreciate that in some implementations, the functionality of device 101 can be implemented using pre-programmed hardware or firmware elements (e.g., application specific integrated circuits ASICs), electrically erasable programmable read-only memories (EEPROMs), etc.), or other related components. In other implementations, the functionality of device 101 can be achieved using a computing apparatus that has access to a code memory (not shown) which store computer-readable program code for operation of the computing apparatus. The computer readable program code could be stored on a computer readable storage medium which is fixed, tangible and readable directly by these components, (e.g., removable diskette, CD-ROM, ROM, fixed disk, USB drive). Furthermore, it is appreciated that the computer-readable program can be stored as a computer program product comprising a computer usable medium. Further a persistent storage device can comprise the computer readable program code. It is yet further appreciated that the computer readable program code and computer usable medium can comprise a non-transitory computer-readable program code and/or non-transitory computer usable medium. Alternatively, the computer-readable program code could be stored remotely but transmittable to these components via a modem or other interface device connected to a network (including, without limitation, the Internet) over a transmission medium. The transmission medium can be either a non-mobile medium (e.g., optical and/or digital and/or analog communications lines) or a mobile medium (e.g., microwave, infrared, free-space optical or other transmission schemes) or a combination thereof.

A portion of the disclosure of this patent document contains material which is subject to copyright protection. The copyright owner has no objection to the facsimile reproduction by any one of the patent document or patent disclosure, as it appears in the Patent and Trademark Office patent file or records, but otherwise reserves all copyrights whatsoever.

Persons skilled in the art will appreciate that there are yet more alternative implementations and modifications possible, and that the above examples are only illustrations of one or more implementations. The scope, therefore, is only to be limited by the claims appended hereto.

What is claimed is:

1. A device comprising:
a memory storing messages, the messages comprising messages designated as unread messages and messages designated as read messages;
a touchscreen including a display;
a processor configured to:
detect a sliding touch input at the touchscreen, the sliding touch input including a change in direction, the sliding touch input terminating in a static touch input;
in response to detecting the change in direction of the sliding touch input, provide, at the display, an initial list of messages and a bar adjacent an edge of the touchscreen display indicating an area for the static touch input, the initial list of messages including at least one of the read messages and at least one of the unread messages; and,
in response to detecting the static touch input in the bar and proximal the edge of the touchscreen, provide, at the display, an unread message list, the unread message list comprising one or more of the unread messages from the initial list of messages.

2. The device of claim 1, the processor further configured to:
generate the unread message list by filtering out the read messages from the initial list of messages.

3. The device of claim 1, wherein a first portion of the sliding touch input is in a first direction and a second portion of the sliding touch input is in a second direction, and the processor is further configured to:
after the static touch input is detected in the bar and proximal the edge of the touchscreen, detect another sliding touch input beginning at a position of the static touch input, in an opposite direction to the second direction; and, in response,
replace, at the display, the unread message list with the the initial list of messages.

4. The device of claim 1, wherein the processor is further configured to, in response to detecting the static touch input in the bar and proximal the edge of the touchscreen, provide, at the display, a preview of a given unread message in the unread message list when providing the unread message list.

5. The device of claim 4, wherein the preview includes:
one or more of metadata associated with the given unread message and a subject of the given unread message; and,
at least a portion of a body of the given unread message,
wherein data provided in the unread message list for each of other unread messages comprises respective metadata and a respective subject.

6. The device of claim 4, wherein the processor is further configured to, in response to detecting a further sliding touch input beginning at a position of the static touch input:
when the further sliding touch input is in a first direction relative to the position of the static touch input, provide, at the display, a preview of a next unread message in the unread message list; and
when the further sliding touch input is in a second direction opposite the first direction, provide, at the display, a preview of a previous unread message in the the unread message list.

7. The device of claim 6, wherein the processor is further configured to, when a given change in position of the further sliding touch input occurs in a length of time greater than a threshold time period, designate a respective one of the unread messages as a read message.

8. The device of claim 6, wherein the processor is further configured to, when a given change in position of the further sliding touch input occurs in a length of time greater than a threshold time period, delete a respective one of the unread messages.

9. The device of claim 1, wherein the processor is further configured to provide, at the display, in the bar and proximal a position of the static touch input, one or more of:
a first icon indicative that the list of the unread messages can be navigated;
a second icon indicative that the list of the unread messages can be navigated to preview a next unread message; and,
a third icon indicative that the list of the unread messages can be navigated to preview a previous unread message.

10. A method comprising:
at device comprising: a processor; a memory storing messages, the messages comprising messages designated as unread and messages designated as read messages; and a touchscreen including a display,
detecting a sliding touch input at the touchscreen, the sliding touch input including a change in direction, the sliding touch input terminating in a static touch input;

in response to detecting the change in direction of the sliding touch input, providing, at the display, an initial list of messages and a bar adjacent an edge of the touchscreen indicating an area for the static touch input, the initial list of messages including at least one of the read messages and at least one of the unread messages; and, in response to detecting the static touch input in the bar and proximal the edge of the touchscreen, providing, at the display, an unread message list comprising one or more of the unread messages from the initial list of messages.

11. The method of claim 10, further comprising:
generating the unread message list by filtering out the read messages from the message list.

12. The method of claim 10, wherein a first portion of the sliding touch input is in a first direction and a second portion of the sliding touch input is in a second direction, and the method further comprises:

after the static touch input is detected in the bar and proximal the edge of the touchscreen, detecting another sliding touch input beginning at a position of the static touch input, in an opposite direction to the second direction; and, in response, replacing, at the display, the unread message list with the message list.

13. The method of claim 10, further comprising, in response to detecting the static touch input in the bar and proximal the edge of the touchscreen, providing, at the display, a preview of a given unread message in the unread message list when providing the unread message list.

14. The method of claim 13, further comprising, in response to detecting a further sliding touch input beginning at a position of the static touch input:

when the further sliding touch input is in a first direction relative to the position of the static touch input, providing, at the display, a preview of a next unread message in the unread message list; and when the further sliding touch input is in a second direction opposite the first direction, providing, at the display, a preview of a previous unread message in the unread message list.

15. The method of claim 14, further comprising, when a given change in position of the further sliding touch input occurs in a length of time greater than a threshold time period, designating a respective one of the unread messages as a read message.

16. The method of claim 14, further comprising, when a given change in position of the further sliding touch input occurs in a length of time greater than a threshold time period, deleting a respective one of the unread messages.

17. The method of claim 10, further comprising providing, at the display, in the bar proximal a position of the static touch input, one or more of:

a first icon indicative of at least one of that the list of the unread messages can be navigated;

a second icon indicative that the list of the unread messages can be navigated to preview a next unread message; and, a third icon indicative that the list of the unread messages can be navigated to preview a previous unread message.

18. A computer program product comprising a non-transitory computer usable medium having a computer readable program code configured to be executed to implement a method comprising:

at device comprising: a processor; a memory storing messages, the messages comprising messages designated as unread messages and messages designated as read messages; and a touchscreen including a display, detecting a sliding touch input at the touchscreen, the sliding touch input including a change in direction, the sliding touch input terminating in a static touch input;

in response to detecting the change in direction of the sliding touch input, providing, at the display, an initial list of messages and a bar adjacent an edge of the touchscreen indicating an area for the static touch input, the initial list of messages including at least one of the read messages and at least one of the unread messages; and, in response to detecting the static touch input in the bar and proximal an edge of the touchscreen, providing, at the display, an unread message list comprising one or more of the unread messages from the initial list of messages.

* * * * *